(12) United States Patent
Cornay et al.

(10) Patent No.: US 7,241,256 B2
(45) Date of Patent: Jul. 10, 2007

(54) CENTRIFUGE

(75) Inventors: Paul J. Cornay, Longmont, CO (US);
Paul V. Begley, Loveland, CO (US);
Louis R. Gervasi, Berthoud, CO (US)

(73) Assignee: ERTH Technologies, Inc., Longmont, CO (US)

( * ) Notice: Subject to any disclaimer, the term of this patent is extended or adjusted under 35 U.S.C. 154(b) by 0 days.

(21) Appl. No.: 11/408,642

(22) Filed: Apr. 21, 2006

(65) Prior Publication Data

US 2006/0258522 A1    Nov. 16, 2006

Related U.S. Application Data

(63) Continuation-in-part of application No. 10/931,056, filed on Aug. 30, 2004, now abandoned.

(60) Provisional application No. 60/673,899, filed on Apr. 22, 2005, provisional application No. 60/546,666, filed on Feb. 20, 2004, provisional application No. 60/498,977, filed on Aug. 30, 2003.

(51) Int. Cl.
*B04B 5/02* (2006.01)
*B04B 11/00* (2006.01)

(52) U.S. Cl. .......................................... 494/31; 494/51

(58) Field of Classification Search ................... 494/22, 494/31, 33, 37, 43–44, 50–56, 60, 67, 74, 494/76–79, 84–85; 210/294, 319, 322, 360.1, 210/380.1, 380.3

See application file for complete search history.

(56) References Cited

U.S. PATENT DOCUMENTS

| 680,270 A | 8/1901 | Ohlsson |
|---|---|---|
| 717,385 A | 12/1902 | Gathmann |
| 778,355 A | 12/1904 | Freas |
| 785,910 A | 3/1905 | Nilsson |
| 949,226 A | 2/1910 | Goodman |
| 949,227 A | 2/1910 | Goodman |
| 1,097,561 A | 5/1914 | Resines |
| 1,124,907 A | 1/1915 | Jahn |
| 1,190,829 A | 7/1916 | Wendell |
| 1,239,734 A | 9/1917 | Sloan et al. |

(Continued)

FOREIGN PATENT DOCUMENTS

DE    2453033 A1 *    5/1976

(Continued)

OTHER PUBLICATIONS

Sharples MaxiMizer XM: For Thickening Without Polymer, 1 page, at least as early as Jun. 1997.

(Continued)

*Primary Examiner*—Charles E. Cooley
(74) *Attorney, Agent, or Firm*—Dorsey & Whitney LLP

(57) ABSTRACT

A centrifuge having a housing having a body and an arm extending from the body, the arm attached to the body at a first end; a chamber defined in the arm; a first tube positioned within the chamber and comprising a porous sidewall; a second tube positioned within the chamber; a first flow path defined by the first tube and second tube; a second flow path defined by the second tube; a first exit in communication with the first flow path for evacuating a first material from the arm; and a second exit in communication with the second flow path for evacuating a second material from the arm. An input mixture enters the arm through an inlet. As the sludge flows along an outer flow region defined by the first tube and interior sidewall of the arm, at least a portion of a liquid passes through the porous sidewall of the first tube and into a middle flow region, analogous to the first flow path. The liquid may drain from the middle flow region through the first exit. Solids exit through the second exit.

39 Claims, 24 Drawing Sheets

U.S. PATENT DOCUMENTS

| | | | |
|---|---|---|---|
| 1,510,657 A | 10/1924 | Coleman |
| 1,564,665 A | 12/1925 | Gates |
| 1,742,096 A | 12/1929 | Perrier |
| 1,783,546 A | 12/1930 | Petsche et al. |
| 1,854,313 A | 4/1932 | Petsche et al. |
| 2,185,279 A | 1/1940 | Strezynski |
| 2,450,737 A | 10/1948 | Rundquist |
| 3,150,944 A | 9/1964 | Nerad |
| 3,623,656 A | 11/1971 | Lavanchy |
| 3,685,721 A | 8/1972 | Kohama |
| 3,837,491 A | 9/1974 | Humiston et al. |
| 4,073,431 A | 2/1978 | Jager |
| 4,108,763 A | 8/1978 | Clough |
| 4,369,115 A | 1/1983 | Bauer |
| 4,500,324 A | 2/1985 | Vuong |
| 4,617,010 A | 10/1986 | Epper et al. |
| 4,618,478 A | 10/1986 | McKinney |
| 4,648,863 A | 3/1987 | Nees |
| 4,673,510 A | 6/1987 | Janusch et al. |
| 4,911,738 A | 3/1990 | Schneider |
| 5,045,202 A | 9/1991 | Stearns et al. |
| 5,132,025 A | 7/1992 | Hays |
| 5,156,751 A | 10/1992 | Miller |
| 5,240,619 A | 8/1993 | Copa et al. |
| 5,252,224 A | 10/1993 | Modell et al. |
| 5,372,725 A | 12/1994 | Halff et al. |
| 5,380,442 A | 1/1995 | Yan |
| 5,425,883 A | 6/1995 | Reid et al. |
| 5,462,676 A | 10/1995 | Pitts |
| 5,470,481 A | 11/1995 | Modell et al. |
| 5,500,120 A | 3/1996 | Baker |
| 5,538,636 A | 7/1996 | Gnann et al. |
| 5,620,606 A | 4/1997 | McBrayer, Jr. et al. |
| 5,651,897 A | 7/1997 | Lehmann |
| 5,688,377 A | 11/1997 | McCutchen |
| 5,688,399 A | 11/1997 | Halff et al. |
| 5,792,351 A | 8/1998 | Wehrle et al. |
| 5,888,389 A | 3/1999 | Griffith et al. |
| 5,928,522 A | 7/1999 | Conaway |
| 5,944,648 A | 8/1999 | Cornay |
| 5,997,812 A | 12/1999 | Burnham et al. |
| 6,080,309 A | 6/2000 | Reid et al. |
| 6,093,328 A | 7/2000 | Santina |
| 6,142,924 A | 11/2000 | Cornay |
| 6,217,502 B1 | 4/2001 | Hallgren et al. |
| 6,251,290 B1 | 6/2001 | Conaway |
| 6,309,338 B1 | 10/2001 | Christensen |
| 6,508,752 B1 | 1/2003 | Hallgren et al. |
| 6,808,481 B1 | 10/2004 | Cornay |
| 6,966,874 B2 | 11/2005 | Cornay et al. |
| 2002/0032111 A1* | 3/2002 | Cornay et al. ............ 494/33 |
| 2004/0142807 A1 | 7/2004 | Cornay et al. |
| 2005/0054507 A1 | 3/2005 | Cornay et al. |
| 2005/0178733 A1 | 8/2005 | Conger et al. |
| 2006/0258522 A1* | 11/2006 | Cornay et al. ............ 494/31 |

FOREIGN PATENT DOCUMENTS

| | | |
|---|---|---|
| EP | 0545683 | 7/1996 |
| EP | 0928227 | 1/2003 |
| GB | 18147 | 9/1907 |
| GB | 269193 | 4/1927 |
| GB | 1526129 | 9/1978 |
| JP | 57004299 | 1/1982 |
| JP | 58034098 | 2/1983 |
| JP | 58095589 | 6/1983 |
| JP | 58205591 | 11/1983 |
| JP | 62007489 | 1/1987 |
| JP | 03293097 | 12/1991 |
| JP | 05068980 | 3/1993 |
| SE | 189162 | 4/1964 |
| WO | WO99/025497 | 5/1999 |
| WO | WO0105498 | 1/2001 |

OTHER PUBLICATIONS

Brochure: CARR Powerfuge Separation System, P6, 2 pages, at least as early as Jan. 14, 1997.

Brochure: CARR Powerfuge Separation System, P12, 2 pages, at least as early as Jan. 14, 1997.

Brochure: CARR Separations, Inc., CARR Powerfuge Separation System, 2 pages, P18, at least as early as Jan. 14, 1997.

Brochure: CARR Separations, Inc., CARR Powerfuge Separation System, P24, 2 pages, at least as early as Jan. 14, 1997.

Borchure: CARR Powerfuge Separation System, Pilot, 2 pages, at least as early as Jan. 14, 1997.

Brochure: CARR Powerfuge Separation System, Pilot for Hazardous Areas, 2 pages, at least as early as Jan. 14, 1997.

Brochure: CARR Introduces Powerfuge, Breakthrough Centrifuge Technology, 1 page, at least as early as Jan. 14, 1997.

Brochure: Chemical Processing, "Technological Improvements in Sedimentation-Type Centrifuges", 6 pages, Jan. 1998.

Brochure: CARR Separations, Inc., "Sub-micron Classification and Recovery", 4 pages, at least as early as Jan. 14, 1997.

Brochure: Alfa-Laval, "Centrifuges for the Chemical Process Industries", 8 pages, 1978.

Alfa-Laval AB, "Waste Oil Recovery", 12 pages, date unknown.

Author Unknown, "Oiltools: Solids Control Equipment", 4 pages, date unknown.

Brochure: Alfa-Laval, "ALFAX self-cleaning centrifuge separators with controlled partial discharge—WHPX series", 2 pages, date unknown.

TRW, "Brandt Decanting Centrifuges", 5 pages, 1985.

Alfa-Laval, "When to use a disk-stack centrifuge", 19 pages, date unknown.

Brochure: Milchem's New RMS Model High Volume, 3 pages, date unknown.

Alfa-Laval, "Slop Oil Treatment Plant for Crude Oil Recovery", 8 pages, 1987.

Geosource, "Geolograph Pioneer—Manual of Centrifuge Operation", date unknown.

Author Unknown, "Jet mixers for agitating large storage tanks," Chem. Eng (Int. Ed.), vol. 96, No. 1, p. 133, Jan. 16, 1989.

Butcher, C., "Liquid waste solutions," Chemical Engineer (Rugby-UK), No. 551, pp. s27, Oct. 14, 1993.

Min et al., "Advanced treatment of piggery wastewater by MAP, precipitation, and ozone oxidation process using pilot plant," Journal of Korea Solid Wastes Engineering Society, vol. 15, No. 6, pp. 644-652, Sep. 1998.

Sereno et al., "Dewatered sludge storage emissions control using multistage wet scrubbing," Water Environment Research, vol. 65, No. 1, pp. 66-72, 1993.

Theriault et al., "The effect of chemical, physical and enzymatic treatments on the dewatering of tar sands tailings," Fuel, vol. 74, No. 9, pp. 1404-1412, Sep. 1995.

Investor Brochure, Paul J. Cornay, "G-Force Corp.", 1988.

* cited by examiner

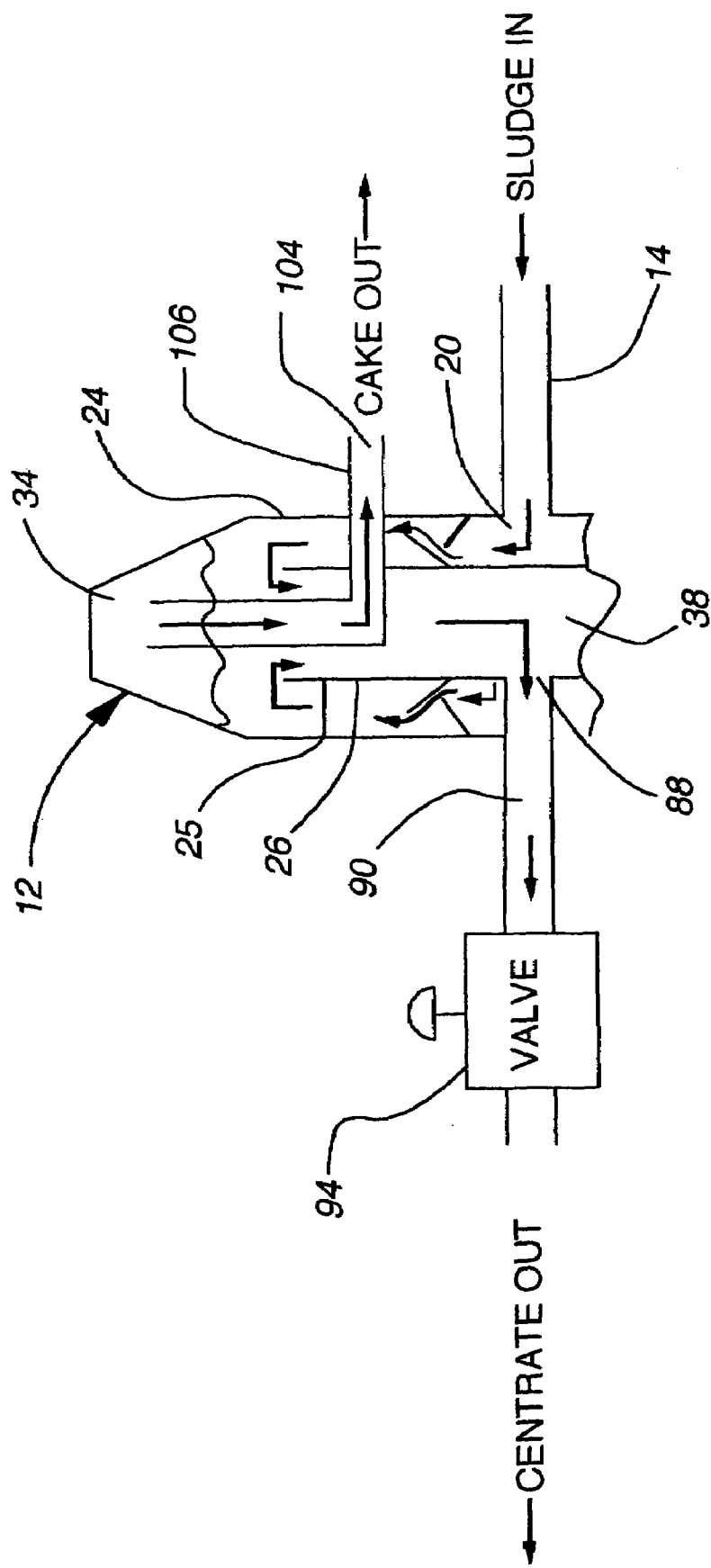

CENTRIFUGE

CROSS-REFERENCE TO RELATED APPLICATIONS

This application claims the benefit under 35 U.S.C. § 119(e) to U.S. Provisional Patent Application No. 60/673,899, filed Apr. 22, 2005 and entitled "Centrifuge," and this application is a continuation-in-part patent application of U.S. patent application Ser. No. 10/931,056, filed Aug. 30, 2004, now abandoned, and entitled "Concentric Tubular Centrifuge," which claims the benefit under 35 U.S.C. § 119(e) to U.S. Provisional Patent Application No. 60/546,666, filed on Feb. 20, 2004 and entitled "Thickening and Dewatering Centrifuge" and U.S. Provisional Patent Application No. 60/498,977, filed Aug. 30, 2003 and entitled "Thickening and Dewatering Centrifuge;" the disclosures of which are hereby incorporated herein in their entireties. This application further incorporates U.S. Pat. No. 5,944,648, issued Aug. 31, 1999 and entitled "Concentric Tubular Centrifuge," U.S. Pat. No. 6,142,924, issued Nov. 7, 2000 and entitled "Concentric Tubular Centrifuge," and U.S. Pat. No. 6,808,481, issued Oct. 26, 2004 and entitled "Concentric Tubular Centrifuge," in their entireties.

BACKGROUND OF THE INVENTION

1. Technical Field

This invention relates to centrifuges, and more particularly to centrifuges separating a solid material from a liquid material in an input sludge.

2. Discussion of Background Art

Centrifuge technology has long been used for separating, lighter material from heavier material from initial material consisting of a combination of the two. Centrifuge technology has been implemented in medical, industrial, agricultural, and public service sectors in various specific applications where separation technology is beneficial.

The effectiveness of presently known centrifuge technology depends on the level of the separating force (centrifugal force) generated by the centrifuge and the residence time of the material under the separating force. Virtually all centrifuges rely on some type of rotary motion to generate the separating force, and thus the level of the separating force generated depends on the size of the centrifuge and the speed at which the centrifuge is rotated. To generate a given level of separating force, a small-scale centrifuge must be driven at a higher number of revolutions per minute than a large-scale centrifuge.

The residence time of the material under the separating force is dependent upon the flow-path of the material through the centrifuge. The flow-path is defined by the internal structure of the centrifuge, and is sometimes limited by the type of centrifuge. Typically, the higher the residence time of a material under a given separation force, the better the separation of the light material from the heavy material.

Existing centrifuge technology is limited in its ability to allow changes to the separation force and/or the residence time.

In addition, existing relatively large-scale centrifuge technology capable of handling relatively large inflow rates such as 100 gallons per minute, is not conducive to portable use in a self-contained unit. The structures are difficult to transport, require frequent skilled maintenance, and often do not allow simple modification of the separation force or residence time to adjust to varying raw material conditions, or final material requirements.

It is with the foregoing issues that the centrifuge of the present invention was developed.

SUMMARY OF THE INVENTION

Generally, one embodiment of the present invention takes the form of a tubular centrifuge. The centrifuge is designed to continuously separate large volumes of sludge, such as waste water, industrial wastes, and/or oil well drilling fluids. The centrifuge is constructed of at least two laterally opposed, axially aligned arms which extend perpendicularly outwardly from a center main shaft, which may be vertically or horizontally aligned. Certain alternative embodiments may employ a single arm and a counterbalancing weight, or a motive source sufficiently powerful and configured to operate despite the off-balance forces generated when a single arm is employed.

The centrifuge may include a housing having a body and an arm extending from the body or housing, the arm attached to the body at a first end; a chamber defined in the arm; a first tube positioned within the chamber and comprising a porous sidewall; a second tube positioned within the chamber; a first flow path at least partially defined by the combination of the first tube and second tube; a second flow path at least partially defined by the second tube; a first exit in communication with the first flow path for evacuating the first material from the arm; and a second exit in communication with the second flow path for evacuating the second material from the arm. An input mixture, such as a sludge, may enter the arm from the body through an inlet. As the sludge flows along an outer flow region defined by the first tube and interior sidewall of the arm, at least a portion of a liquid may pass through a porous or semi-porous sidewall of the first tube and into a middle flow region, analogous to the first flow path. The liquid may drain from the middle flow region through the first exit. Additional tubes may be positioned within the chamber, beyond the aforementioned tubes.

A pump forces sludge into and along the arm. Solids aggregate at a distal end of the arm and form a cake. Centrifugal force, combined with the pressure inside the arm, draws liquid from the cake and channels the liquid to the aforementioned middle flow region, and ultimately out the first exit. A scraper may mix, cut or chop the cake into particles or chunks of solids, which may be lifted into the second flow path, also called an inner flow region, within the second tube. The solids may be moved through the inner flow region either by a pressure differential defined along the inner flow region, or by an auger or other device. A solids exit is defined in the base of the inner flow region.

The solids exit is in communication with an exit arm. The exit arm may be radially adjusted to change the point along the arm's longitudinal axis at which solids exit, called the outer aperture. By changing the longitudinal location of the outer aperture, the pressure differential between the arm interior/solids exit and the outer aperture (which is at atmospheric pressure) may be varied. As the outer aperture approaches a base end of the arm, the pressure differential between the corresponding segment of the arm interior and the outer aperture decreases and solids exit the arm via the inner flow region, solids exit, and exit arm more slowly. As the outer aperture is moved longitudinally upward along the arm from the base, the pressure differential increases and solids exit the arm more rapidly. Solids essentially flow from a distal end of the arm, through the inner flow region, along the solids exit, and out the outer aperture.

Generally speaking, the pressure at the distal end of the arm exceeds the pressure at the base end, because the centrifugal force generated by rotation of the arm directs material towards the distal end. As previously mentioned, input material is channeled into the arm along the first flow path from the base to the arm's distal end. The pressure in the exit arm varies as it is raised (moved towards the distal end) or lowered (moved towards the arm base). Since the pressure increases along the arm from base to distal end, raising the exit arm increases the pressure therein and lowering it decreases the corresponding pressure. Thus, as the exit arm is raised, the pressure differential between the point in the arm interior radially corresponding to the outer aperture and atmosphere increases, and solids therefore are driven more rapidly through the exit arm.

One embodiment of the present invention may take the form of a centrifuge for separating a first material from a second material in an input mixture, including a housing having a body and an arm extending from the body, the arm attached to the body at a base end and free at a distal end, a chamber defined in the arm, a first tube positioned within the chamber, a second tube positioned within the chamber, a first flow path at least partially defined by the combination of the first tube and second tube, a second flow path at least partially defined by the second tube, a first exit in communication with the first flow path for evacuating the first material from the arm, a second exit in communication with the second flow path for evacuating the second material from the arm, an inlet operative to introduce the input mixture into the arm and in fluid communication with the chamber; and a diffuser positioned at least partially between the inlet and the first flow path.

A second embodiment of the present invention may take the form of a centrifuge having a body, an arm affixed to the body, the arm defining an interior space, a first tube positioned within the interior space, the first tube extending along a longitudinal axis of the arm, a second tube positioned within the first tube the second tube defining a second tube interior passage, a flow diffuser positioned at least partially about the circumference of the first tube, a liquid exit defined between the first and second tubes, a solids exit extending from the second tube interior passage, and an exit arm in fluid communication with the solids exit, wherein the exit arm may be pivoted about a pivot point.

Yet another embodiment of the present invention may take the form of a method for capturing a first material and a second material, including the operations of introducing a mixture containing the first and second materials into a centrifuge arm, rotating the centrifuge arm, impacting the mixture against a flow diffuser to spread the mixture about a circumference of the centrifuge arm, separating the first material from the second material, forcing the first material out a first exit; and forcing the second material out a second exit.

Still another embodiment of the present invention may take the form of a centrifuge arm having an auger disposed therein to restrict flow of a material along the centrifuge arm. A further embodiment of the present invention may take the form of a centrifuge arm having an apparatus for controlling a flow rate of a solid through a solid exit, where the solid exit is in communication with an interior of the centrifuge arm. The apparatus may include an exit arm rotatable about a pivot point. Still another embodiment of the present invention may take the form of a centrifuge arm having a first exit for a first material and a second exit for a second material, where the second exit is further from a centerline of rotation of the arm than the first exit. An additional embodiment of the present invention may take the form of a centrifuge arm having an adjustable back pressure control, which may be implemented as a valve restricting or preventing flow through a liquid exit passage. The back pressure control may be adjusted in real time to maintain a desired pressure within the centrifuge arm and/or liquid exit passage. Still another embodiment of the present invention may take the form of a centrifuge arm having a clamshell structure forming at least a portion of the arm exterior. Yet another embodiment of the present invention may take the form of a centrifuge arm having an automatic stirrer located beneath an end cap of the centrifuge arm, such that the stirrer may break up and/or move solids collected beneath the end cap. A further embodiment of the present invention may take the form of a centrifuge having a main shaft and at least one arm, the main shaft operationally attached to the arm and affixed to a frame by two bearings. Still another embodiment of the present invention may take the form of a centrifuge having an arm with an exit port and an inlet port, where the exit port permits a liquid to exit the arm and the inlet port communicates a mixture to the arm. In such an embodiment, the exit port may be in an inner annular area and the inlet in an outer annular area. Still a further embodiment of the present invention may take the form of a centrifuge having an arm and a shroud affixed thereto such that the shroud rotates with a rotation of the arm. Another embodiment of the present invention may be a centrifuge wherein the rotation of a centrifuge arm and/or main shaft connected thereto is accomplished with a drive system and geared main shaft, as opposed to employing a hydraulic system to facilitate rotation. Still a further embodiment of the present invention may take the form of a centrifuge having an arm and an exit tube fluidly connected to the arm. In this embodiment, an auger may be positioned within the exit tube and act to restrict flow of a material through the exit tube. In still a further embodiment, a centrifuge arm may include a solids exit passing through an end of the arm, such as an end cap, and/or aligned with a longitudinal axis of the arm. Such an exit may include a valve to regulate flow through the solids exit.

Additional features and advantages of the invention will be apparent upon reading the following detailed description of the invention.

BRIEF SUMMARY OF THE FIGURES

FIG. 2B is a simplified schematic of the arm of FIG. 2A, showing flow path for sludge entering the arm and liquid exiting the arm.

DETAILED DESCRIPTION OF THE INVENTION

Figure 1A:
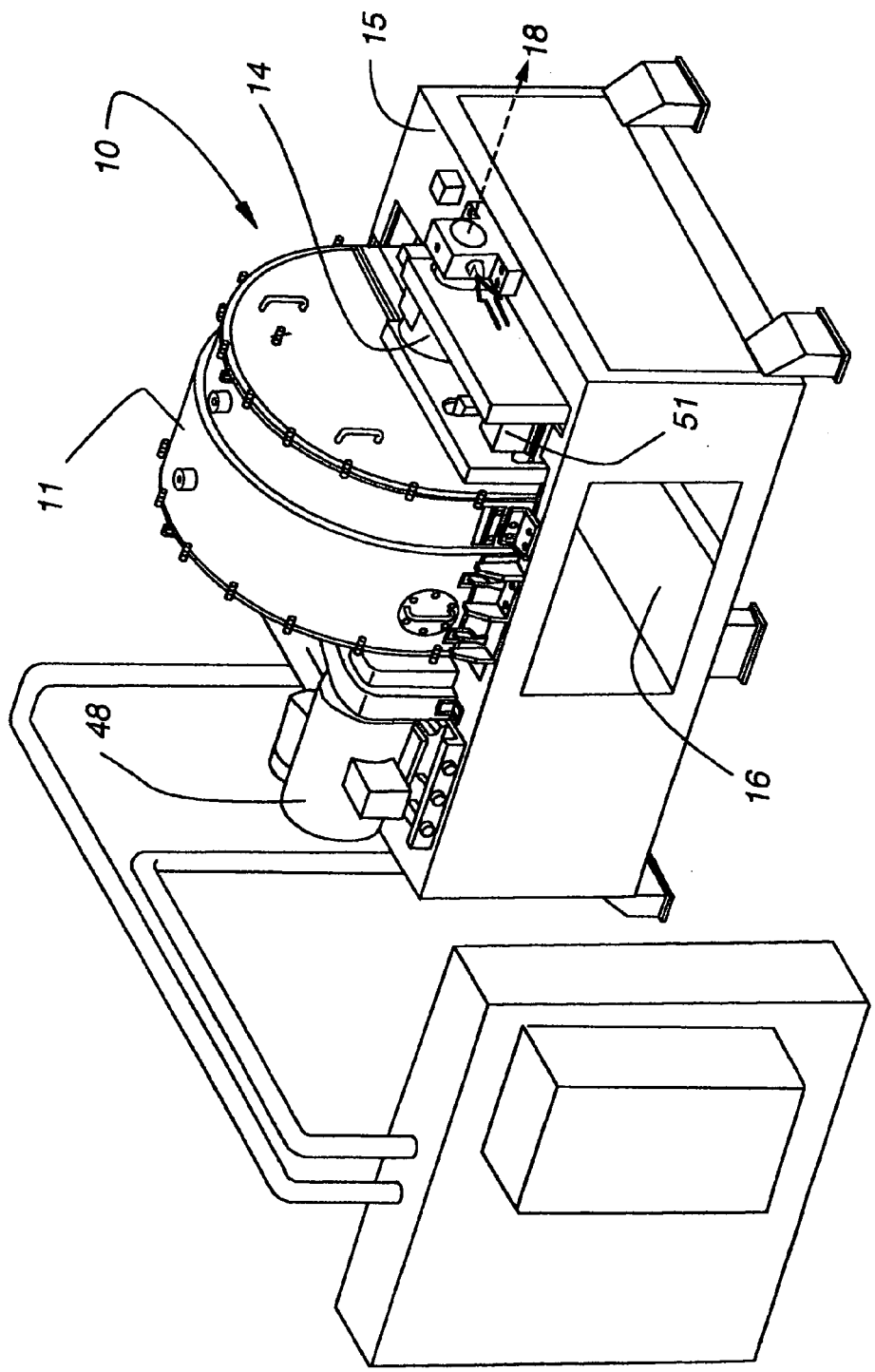
FIG. 1a depicts a centrifuge, in accordance with a first embodiment of the invention.

Generally, one embodiment of the present invention takes the form of a concentric tubular centrifuge 10, as shown and depicted in FIGS. 1a–11. The centrifuge 10 is designed to continuously separate large volumes of sludge, such as waste water, agricultural wastes and byproducts, industrial wastes, food wastes, chemical products, biotechnology wastes, and/or oil well drilling fluids. The centrifuge 10 is constructed of at least two laterally opposed, axially aligned arms 12 which extend perpendicularly outwardly from a center main shaft 14, which may be vertically or horizontally aligned. Certain alternative embodiments may employ a single arm and a counterbalancing weight, or a motive source sufficiently powerful and configured to operate despite the off-balance forces generated when a single arm 12 is employed, as well as a properly-configured support structure. FIG. 1a depicts the centrifuge 10 with an arm shroud 11 in place, while FIG. 1b depicts the centrifuge with the arm shroud removed.

Figure 1B:
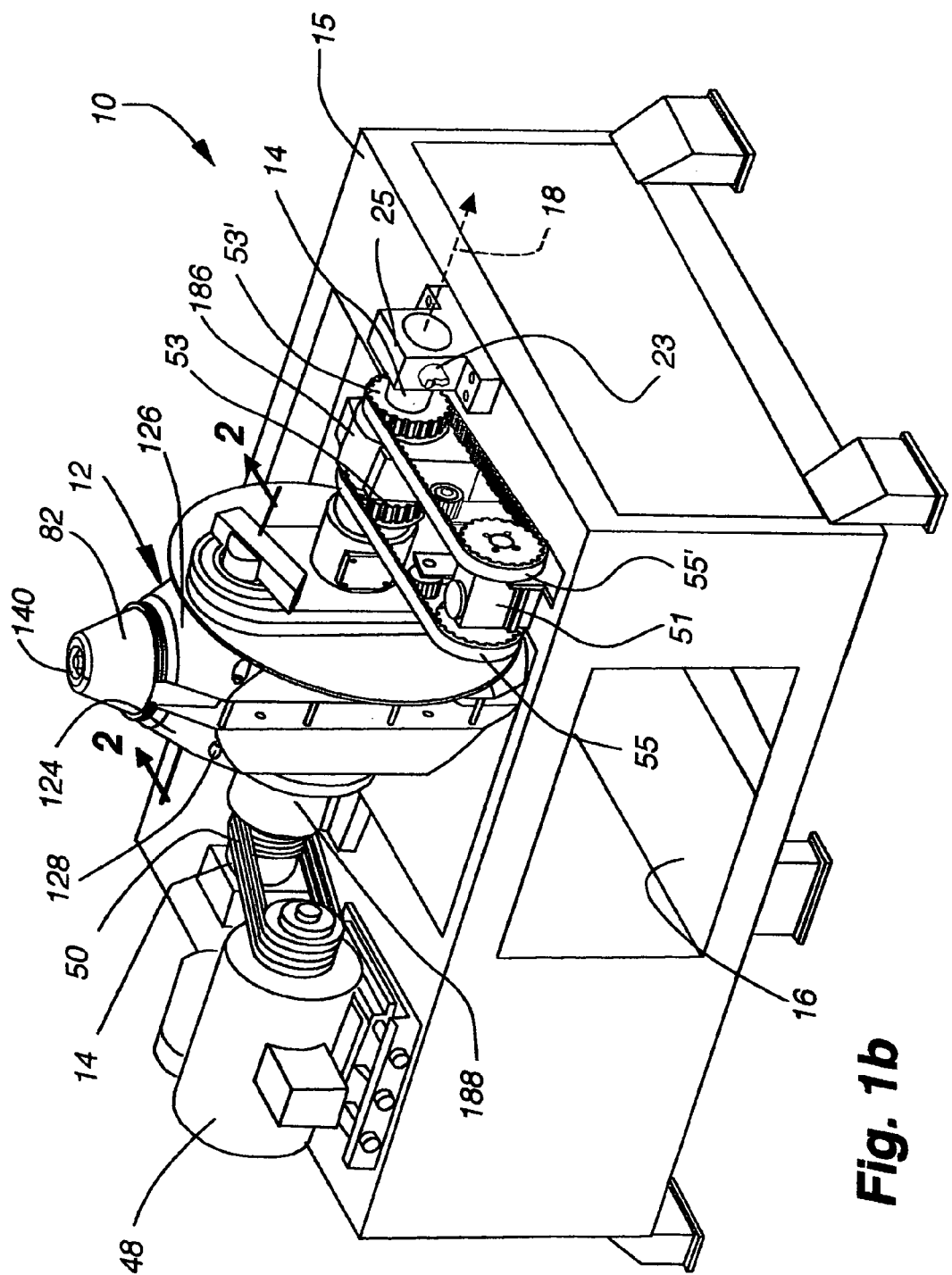
FIG. 1b depicts the centrifuge of FIG. 1 with an arm shroud removed.

A general description of the operation of the centrifuge may prove beneficial prior to discussing the embodiments in detail. Reference to FIGS. 1b and 2 may aid tracing the flow of sludge through the centrifuge 10. Sludge enters the centrifuge 10 through an inlet hose 23 affixed to a rotary union 25. Generally, a pump 27 (not shown) forces sludge through the inlet hose 23 and rotary union 25, and further into a main shaft 14. The pressure-driven sludge enters an arm 12 from the main shaft, typically through an inlet 20. In the arm 12, the sludge flows from a base of the arm adjacent the inlet 20, along an outer flow region 28, and to a distal end 34 of the arm. An end cap 82 defines and covers the arm's distal end. Solids generally form a cake at the distal end 34, while liquid exits this cake as it compacts. When the arm 12 fills with sludge, solids, and/or liquids, pressure exerted by the pump 27 forcing more sludge into the arm from the main shaft 14 drives the liquids and solids already in the arm to exit. Additionally, pressure exerted by the rotation of the arm (and resulting centrifugal force) also drives both liquids and solids in the arm to their respective exits.

Since the separated liquids are more fluid and less dense than the solids, they may be pushed back down the arm towards the base. Insofar as the pump 27 provides pressure and a steady input stream preventing the liquid from flowing back through the inlet, the liquid is forced out an outlet passage 88 defined in a middle flow region 30, in the base of the arm. The outlet passage 88 lead into an outlet channel 90 running along another portion of the main shaft 14. Liquid is collected from the outlet channel and dealt with accordingly.

Solids, meanwhile, are mixed by a scraper rotating beneath the end cap. (In many embodiments, the scraper may be optional and omitted.) Centrifugal force, resulting from rotation of the arm 12, drives the solids in the arm out an exit passage (described in more detail below). Further, just as the pressure exerted by new input material being pumped into the arm 12 forces the liquid out the outlet passage 88, this pressure assists in evacuating solids from the arm interior. The solids, however, are not as fluid as the liquid component of the sludge (and are also denser), and thus resist flowing back to the base of the arm. Instead, a second exit is defined from the arm 12 interior in the form of a solids exit tube 104 and exit arm 106 communicating with atmosphere. The solids exit tube 104 is longitudinally spaced away from the arm base. Further, and as described in more detail below, the pressure in the exit arm 106 in communication with the solids exit tube 104 may be varied to enhance solids exit from the arm.

Regardless, the solids generally form a plug of material in the exit arm 106, preventing liquid from flowing therethrough. Solids migrating from the distal end 34 of the arm 12 maintain this plug. Accordingly, mainly solids flow out the exit arm 106 and solids exit tube 104. The solids may be captured in a shroud surrounding the exit arm 106 for later handling.

As used herein, the term "solids" generally refers to sludges, particulates, or slurry having solid material comprising at least a substantial percentage thereof. Typically, the solid material is approximately 10–30%, by weight, of the material. Solid material may, however, comprise as little as 5% or as much as 50%, by weight, of the material classified herein as "solids." It should be noted some minimal amount of solid material may be present in the liquid discussed herein, but such solid material is generally less than 5%, by weight, of the liquid. In many cases, the present embodiment captures approximately 99%, by weight, of all solids entering the centrifuge in the sludge.

Returning to the discussion of the present embodiment and FIGS. 1a–1b, the main shaft and arms are supported by a housing 15, which is attached to a frame 16. The main shaft 14 passes through, and is supported by, a first bearing 186 and second bearing 188. The first and second bearings 186, 188 permit the main shaft 14 to rotate with rotation of the arm 12. These two bearings 186, 188 are generally sufficient to support the shaft and allow it to rotate as necessary, although alternative embodiments may employ additional bearings. The centrifuge is driven by an external motor to rotate about a longitudinal or vertical axis 18 of the center main shaft which develops the centrifugal forces necessary for operation. The centrifuge preferably operates in the range of 600–2000 rpm, depending on its overall size.

Figure 2A:
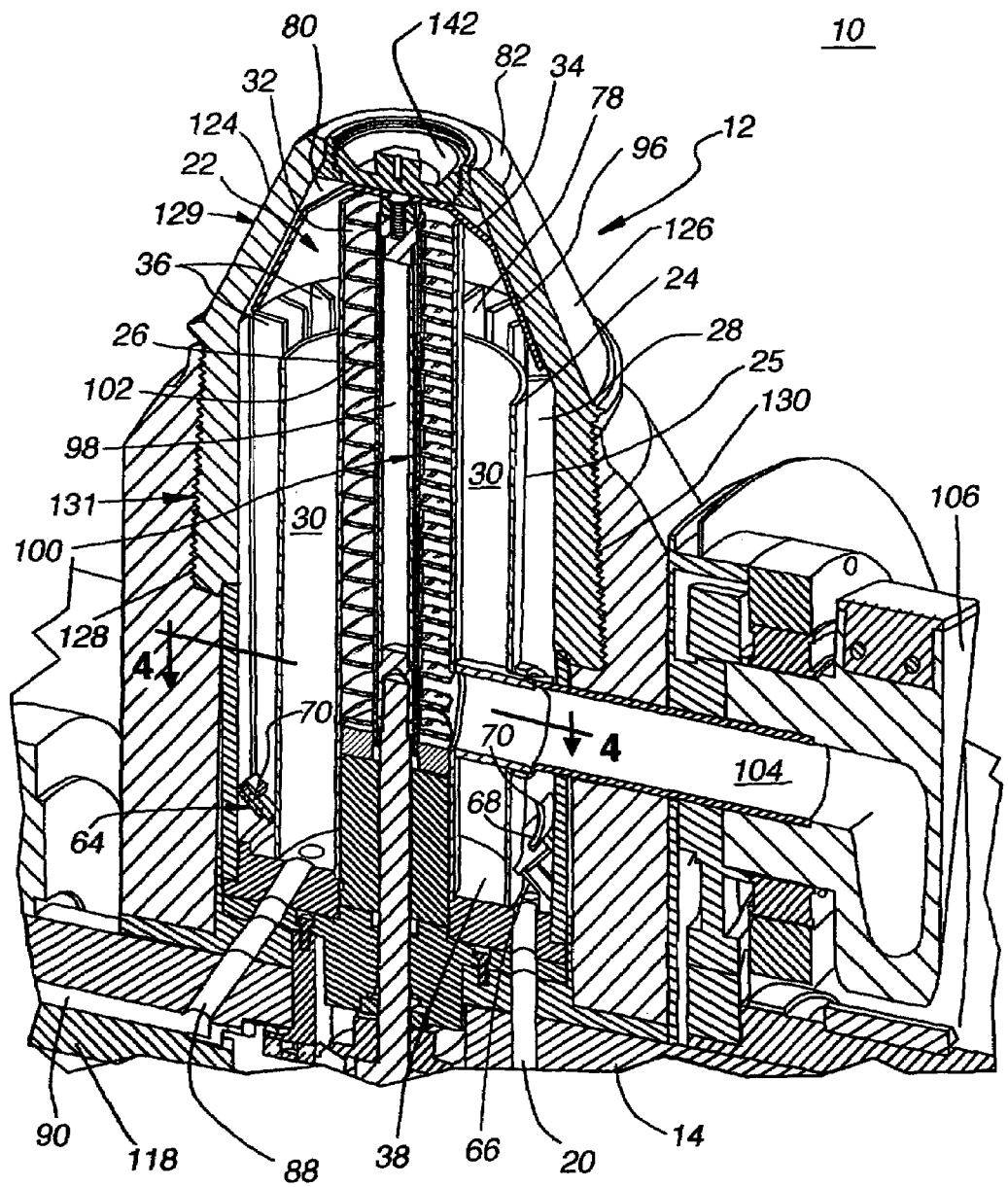
FIG. 2A depicts a cross sectional view of an arm of the centrifuge, taken along line 2—2 of FIG. 1b.

Each arm 12 is identically constructed, and comprises a plurality of concentrically spaced tubes. FIG. 2A, for example, depicts a cross-section of one of the centrifuge arms, taken along line 2—2 of FIG. 1b. As shown generally in FIGS. 2A and 8, sludge flows along an intake passage 19 defined in the main shaft 14 and through an inlet 20, ultimately entering the interior chamber 22 of the arm 12. Multiple tubes 24, 26 divide the chamber 22 into various flow regions, such as an outer flow region 28, middle flow region 30, and inner flow region 32. The movement of sludge through the arm 12, separation of heavier and lighter components from the sludge by the various tubes 24, 26 and flow regions 28, 30, 32, is discussed in more detail below. The terms "solid" and "liquid" may further be generally used to refer to materials heavier and lighter, respectively, than their counterpart materials in the input sludge. Typically the heavier components of the sludge are solids, while the lighter sludge components are liquids. This is not necessarily the case, however. Accordingly, the terms "solid" and "liquid," as used herein, are terms of convenience and are meant to encompass relatively heavier and lighter materials that may be separated from one another, even where (for example) the lighter material may include a powder or other light solid. Alternatively, the present invention may be used to separate heavier liquids from lighter liquids (i.e., as a liquid-liquid separator). In such a case, the heavier liquid would follow the solids flow path and act generally in a manner similar to that described herein with respect to solids.

In brief and with respect to FIGS. 2A and 2B, a pump (not shown) at least partially moves sludge from the inlet 20 to a distal end 34 of the arm along interior channels partially defined by radial fins 36. Due to centrifugal force generated by rotation of the arm, heavier material (i.e., solids) collect at the distal end 34, while liquid and/or lighter material may return to the proximal end 38 of the arm. Liquid may also propagate through the porous sidewall of the middle tube 25. The force exerted by the pump to force sludge into the arm may also facilitate this motion and/or separation.

It should be noted FIG. 2B is a schematic of the centrifuge arm 12 and main shaft 14, and thus is greatly simplified for clarity. Accordingly, FIG. 2B should be taken only to show the flow path of liquid or centrate through the arm 12 and main shaft 14, and not as representative of the entirety of the arm 12, any of its constituent elements, or the assembly or relationship between such elements.

Liquid exits the arm 12 through an outlet 88 in fluid communication with a liquid exit passage 90. Solids exit the arm 12 through an exit arm 106 which defines a solids exit tube 104 and is in fluid communication with the inner flow region 32. In this manner, the liquid and solid components of the sludge may exit the centrifuge 10 separately. As generally shown in FIG. 2A, the liquid exit passage 90 runs along an interior of the main shaft 14. The liquid exit passage 90 may be ring-shaped in cross-section, encircling a drive shaft 118. (That is, the liquid exit passage may be annular, for example.) Thus, the outlets 88 for both arms drain to a single liquid exit passage 90. An outlet valve 94 (see FIG. 2B) controls flow of liquid out of the liquid exit passage. Generally, liquid exiting the centrifuge 10 is recycled through a drain or pipe, re-entering the plant or reservoir from which the input sludge was drawn. Alternate embodiments may capture the liquid instead of recirculating it, for example in a catch basin or collection shroud encircling an exit from the liquid exit passage 90. The cleaned liquid may be used for a variety of applications, such as irrigation, rather than being recycled.

Generally, certain embodiments of the invention may employ an adjustable back-pressure control affixed or associated with the liquid exit passage 90. For example, the outlet valve 94 may be an adjustable valve capable of assuming a variety of positions between fully open and fully closed, inclusive. As the valve 94 is more fully opened, pressure in the liquid exit passage 90 (and ultimately within the arm 12) may decrease. Similarly, as the valve 94 is closed, pressure in the liquid exit passage 90 may increase. The outlet valve 94 may be adjusted in real-time and may incorporate a feedback circuit. The feedback circuit may, for example, measure the back-pressure in either the arm 12 or liquid exit passage 90 (or conceivably within the exit arm 12) and adjust the seating or position of the exit valve 94 to maintain a given or desired pressure. Similarly, the feedback circuit may be connected to a flow measurement device that measures the flow of liquid out of the liquid exit passage 90. In such an embodiment, the feedback circuit may adjust operation of the valve to maintain a desired flow rate.

Returning to FIGS. 1a and 1b, it should be noted that the present embodiment employs an external drive system, including a geared shaft, to rotate the arms 12. No hydraulics are necessary for operation of the embodiment and particularly for rotation of the centrifuge arms, although alternative embodiments may employ hydraulics if desired. A motor 48 is connected by one or more drive belts 50 to the main shaft 14. The motor 48 and associated drive belt 50 rotate the main shaft 14, which in turn rotates the arms 12. The motor 48 is mounted to the housing 15 or frame 16 for stability. The motor is typically a variable-speed electric motor, capable of rotating the arms 12 and body at a variety of speeds. Alternative embodiments may use a combustion motor, a transmission with multiple gears, or any other suitable power source to rotate the centrifuge 10 arms and body.

As best seen in FIG. 1b, a phase shifter 51 is connected to a first and second shift sheave 53, 53' by a pair of belts 55, 55'. The phase shifter 51 operates to adjust the position of the exit arm 106 and associated outer aperture. The phase shifter 51 adjusts the positions of the first and second shift sheaves 53, 53' relative to one another by turning the belts 55, 55' at differing speeds. Accordingly, the sheaves turn at different speeds, and their relative positions adjust. By changing the relative positions of the sheaves 53, 53', the exit arm 106 and outer aperture 110 may be moved radially along the arm 12. This, in turn, may enhance or limit removal of solids from the interior of the arm 12, as discussed in more detail below. It should be noted the phase shifter may operate to adjust the positioning of the exit arm and outer aperture during operation of the centrifuge. Alternative phase shifters, as known to those of ordinary skill in the art, may be employed instead of (or in addition to) the one described.

Figure 8:
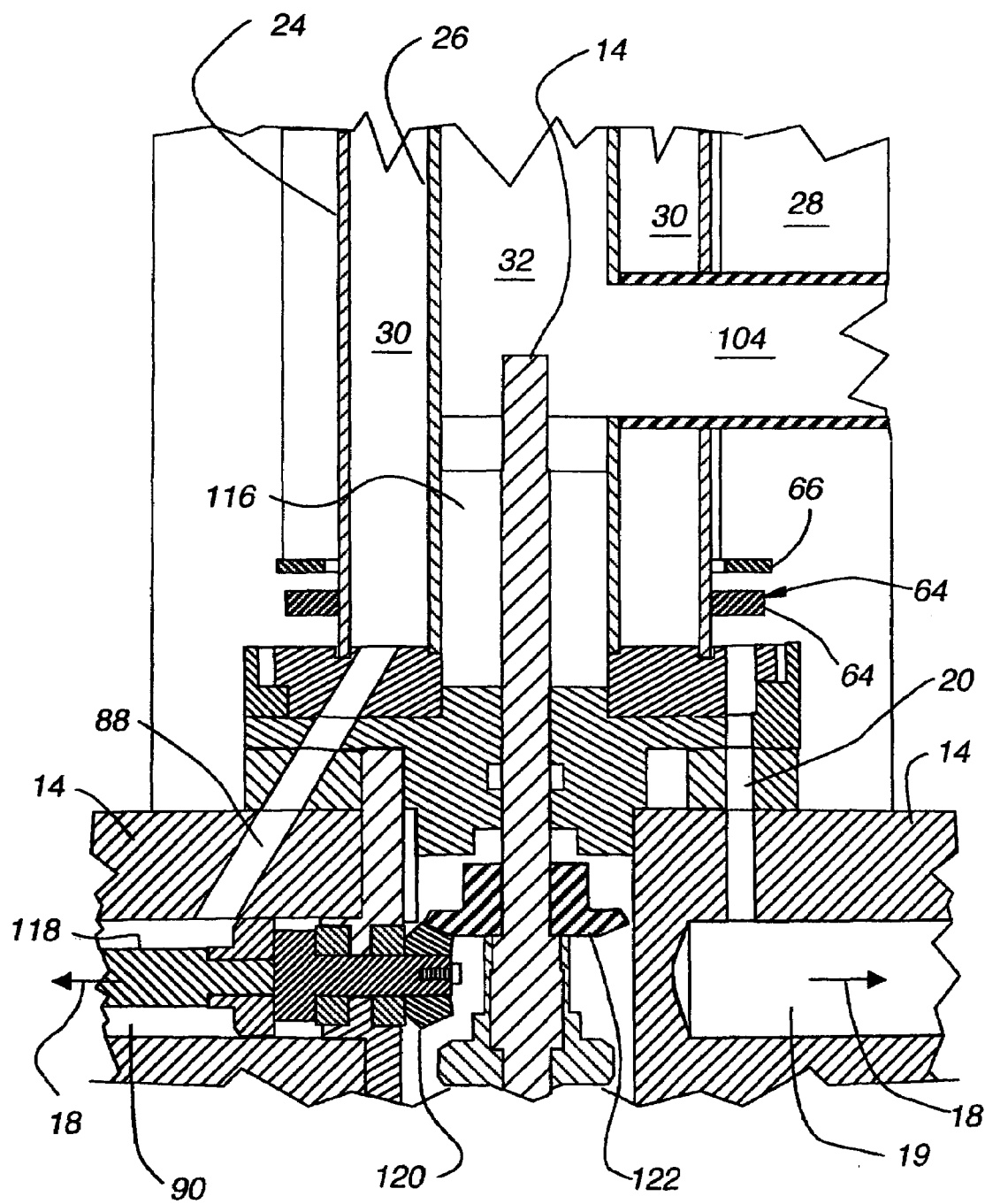
FIG. 8 depicts a partial cross-sectional view of the arm of FIG. 2A and the main shaft of the centrifuge.

To enter the centrifuge, as best seen in FIGS. 1B, 2 and 8, sludge is pumped along the input hose 23, through the first rotary seal 25, and into the main shaft 14. Within the main shaft 14, sludge flows along a main shaft passage 19. In the present embodiment, the main shaft passage 19 extends along the center of the main shaft 14. Accordingly, sludge flowing along the main shaft passage 19 experiences lower centrifugal force than if the passage were located radially from the main shaft's centerline.

An inlet 20 channels sludge from the main shaft passage 19 to the outer flow region 28 of the arm 12. Each arm 12 is fed by a separate inlet 20. As shown to best effect in FIG.

8, the inlets 20 extend perpendicularly from the main shaft passage 19. It should be noted that the centrate generally flows into the outer flow region 28 and ultimately exits the arm through the outlet 88, which is located in a middle flow region 30. Certain embodiments may reverse the positioning of the inlet 20 and outlet 88.

Upon entering the arm 12, the sludge impacts a diffuser 64. The diffuser 64 generally directs sludge flow along the arm to counteract any coriolis effect created by rotation of the arm 12. This facilitates filling up the arm 12 evenly with sludge, as well as evening out the flow and flow velocity of sludge throughout the arm. Additionally, the diffuser 64 may reduce flow velocity of the sludge along the arm, increase residence time for particulates, sludge, and so forth within the outer flow region 28, and reduces fluid shear of the sludge or liquid within the outer flow region 28 (thus improving separation of solids and liquids). The fins (discussed in more detail below) may cooperate with the diffuser 64 to enhance the anti-coriolis effect. The diffuser encircles the base of the middle tube 25, and is shown to best effect in FIGS. 2A, 3, and 8. The diffuser 64 generally consists of a bottom diffuser plate 66, top diffuser plate 68, and one or more diffuser clips 70. The bottom diffuser plate 66 (FIG. 3) angles toward a center of the arm, while the top diffuser plate angles away from a center of the arm. The base of the top diffuser plate 68 and peak of the bottom diffuser plate 66 are adjacent one another, and may be bonded or affixed to one another. The diffuser clip 70 is attached to the upper end of the top diffuser plate 68. The diffuser clip 70 covers a section of the upper end of the top diffuser plate 68, but generally leaves at least a portion thereof uncovered. The amount uncovered may be varied not only between embodiments, but also by a user configuring the present embodiment. For example, multiple diffuser clips 70 may be positioned adjacent one another to present an unbroken surface covering a larger portion of the upper end of the top diffuser plate 68 than would be shrouded by a single clip.

As sludge impacts the bottom diffuser plate 66, it spreads along the circumference of the bottom diffuser plate. Thus, the diffuser 64 generally distributes sludge entering the arm 12 from the inlet 20 across a greater segment of the arm circumference than would be the case if sludge flowed directly into the arm. Sludge may be distributed in such a manner with or without the use of a top diffuser plate 68 or diffuser clip 70.

Figure 20:
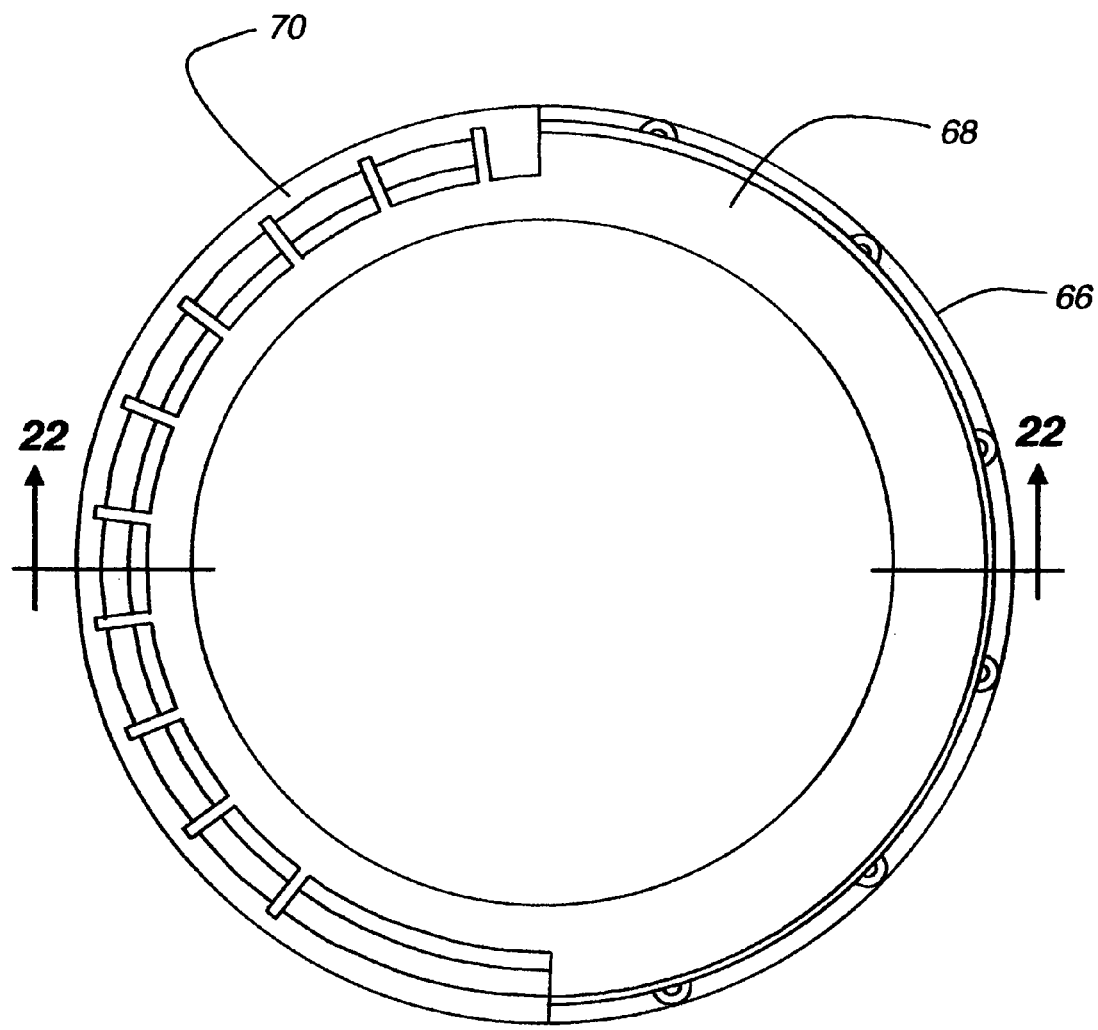
FIG. 20 is a top view of a diffuser plate.
Figure 21:
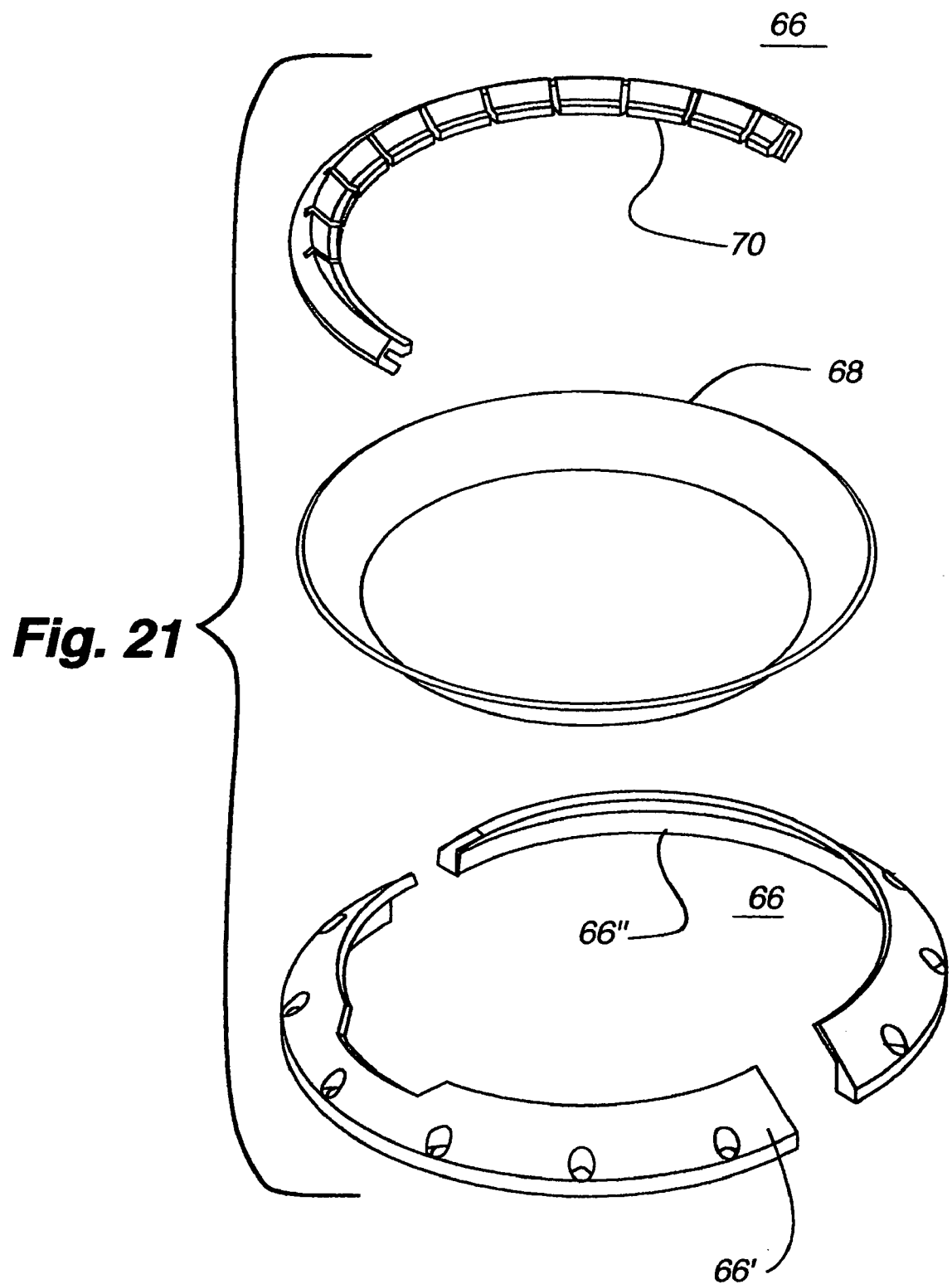
FIG. 21 is an isometric view of various components of the diffuser plate of FIG. 20.
Figure 22:
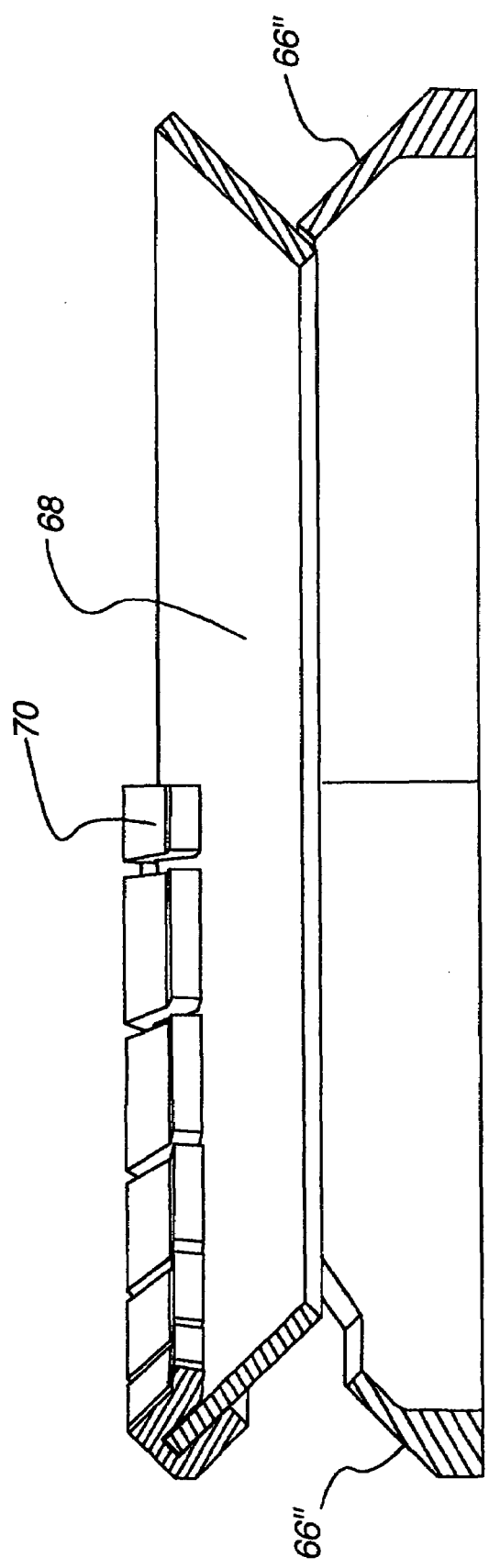
FIG. 22 is a cross-section taken along line 22—22 of FIG. 20.

The diffuser 64 is shown in more detail in FIGS. 20–22. FIG. 20 is a top-down view of the diffuser 64, showing the diffuser clip 70 affixed to the top diffuser plate 68, which in turn abuts the bottom diffuser plate 66. FIG. 21 depicts isometric views of the two portions of the bottom diffuser plate 66, the top diffuser plate 68, and the diffuser clip 70 in a disassembled state. As shown in FIG. 21, the bottom diffuser plate 66 may be made of a front diffuser plate portion or half 66' and a back diffuser plate portion or half 66"; in alternative embodiments the diffuser plate 66 may be formed as a single piece or from three or more pieces. The hole or gap 72 is typically formed in one of the diffuser plate halves 66', 66". FIG. 22 is a cross-sectional view taken along line 22—22 of FIG. 20, showing the relationship between the diffuser clip 70, top diffuser plate 68 and bottom diffuser plate halves 66', 66". It should be noted that the top diffuser plate and bottom diffuser plate need not be entirely circular but may extend across only an arc instead.

Returning to FIG. 2, the diffuser clip 70 generally constrains sludge flow exiting the diffuser 64. That is, sludge entering the arm 12 impacts the bottom diffuser plate 66, flows therealong inwardly towards the center of the arm, off the bottom diffuser plate, and onto the top diffuser plate 68. Flow from the bottom to the top diffuser plate generally passes through a hole 72 formed in the bottom diffuser plate (see FIGS. 3 and 22). Multiple holes 72 may be defined in the bottom diffuser plate 66, a single hole may be present, or the hole may be a contiguous gap running along the entire circumference of the top and bottom diffuser plates. Regardless, the diffuser clip 70 may be configured to at least partially cover or block the portion of the top diffuser plate adjacent the hole 72 of the bottom diffuser plate, restricting or preventing sludge flow along this portion of the top diffuser plate. The clip may cover a greater or lesser amount of the top diffuser plate 68. Sludge may spread laterally along the portions of the top diffuser plate 68 not covered by the diffuser clip 70. Since the outer edge of the diffuser clip 70 is typically spaced to abut the inner wall of the interior chamber 22 of the arm 12, the diffuser clip 70 prevents sludge from spreading beyond uncovered portions of the top diffuser plate. In this manner, the diffuser plate may regulate circumferential flow of sludge about the arm 12.

Figure 3:
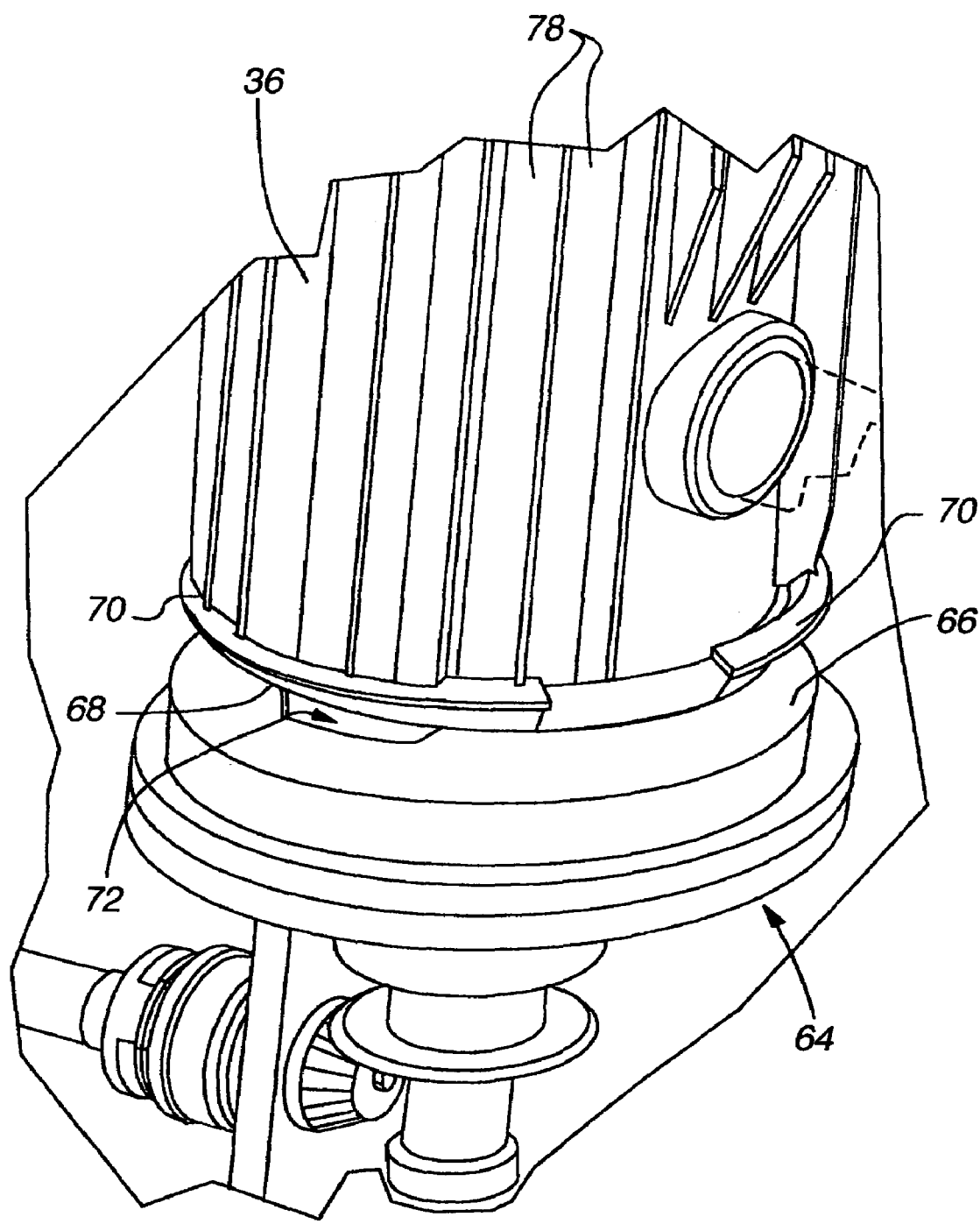
FIG. 3 depicts a perspective view of the interior of the arm, showing a diffuser plate and arrangement of radial fins.
Figure 4:
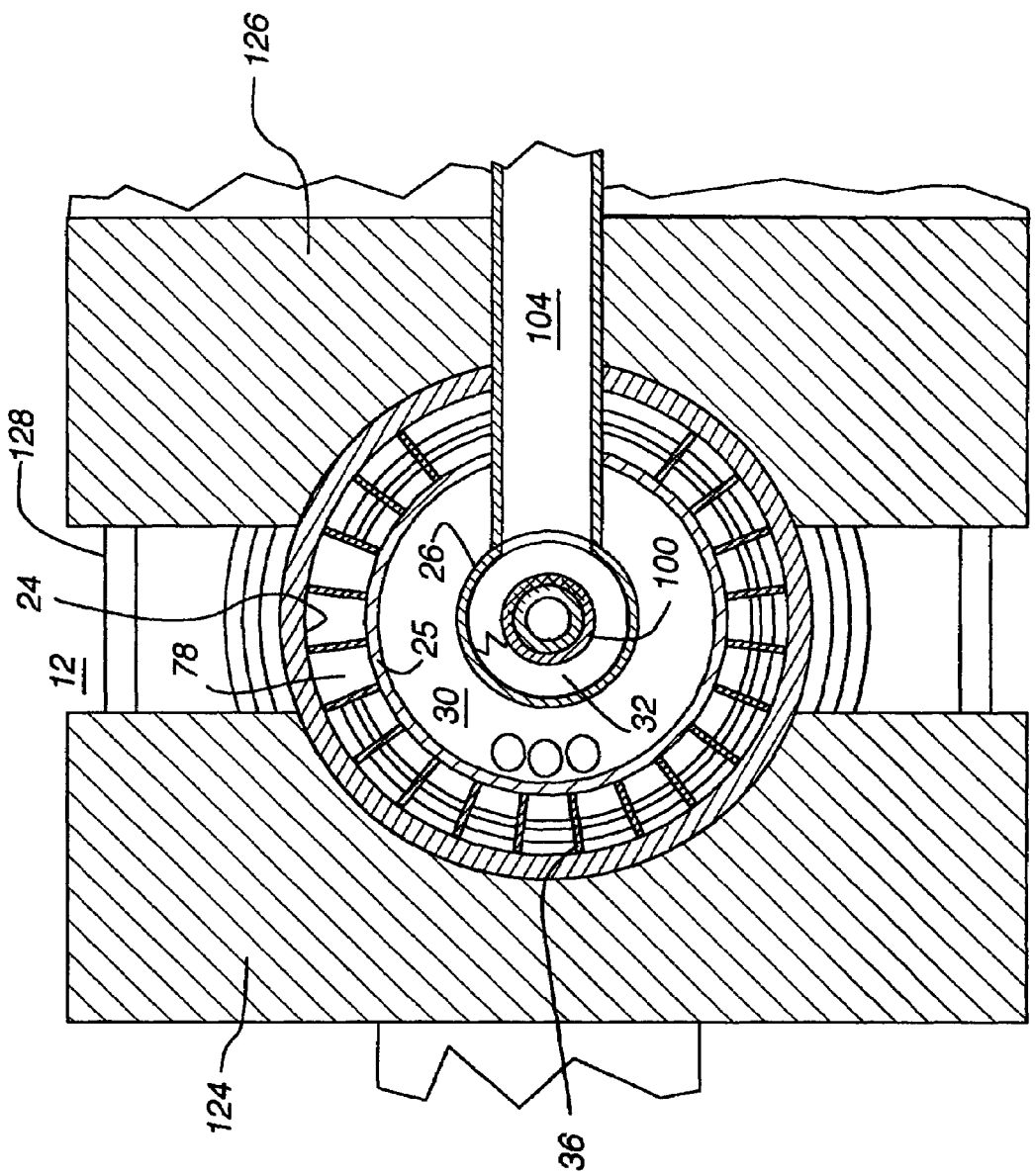
FIG. 4 depicts a cross-sectional view of the arm, taken along line 4—4 of FIG. 2A.

FIG. 3 depicts the diffuser clip 70 covering all but a portion of the top diffuser plate 68. FIG. 3 further depicts the uncovered portion of the top diffuser plate 69 offset by approximately 90 degrees from the hole or gap 72. The exact offset between the hole 72 and uncovered portion of the diffuser plate in the present embodiment is typically 180 degrees, but is depicted as 90 degrees in FIG. 3 in order to show the entirety of both the hole 72 and uncovered portion. In alternative embodiments, the offset may be anywhere between 1 and 180 degrees.

Further, the diffuser may include additional stages, such that sludge flowing about the diffuser top plate 68 may impact a second bottom plate 66 or second top plate 68, to further distribute sludge around the arm. In essence, multiple diffusers 64 or diffuser plates 66, 68 may be employed in alternative embodiments of the invention.

It should be noted the diffuser clip(s) 70 may be placed at any point about the top diffuser plate 68. By strategically placing one or more diffuser clips 70, the flow pattern may be altered as desired. For example, the location of the hole 72 on the circumference of the top diffuser plate 68 may be adjusted by rearranging the diffuser clips 70. Similarly, multiple holes 72 may be created by appropriately spacing the diffuser clips.

Alternate embodiments may employ a different apparatus to distribute flow about the arm 12, such as a deflector plate, or may entirely omit flow distribution apparatuses. For example, the deflector plate may have a base and a curved arm extending therefrom. The curved arm typically projects upwardly from the base, with the arm's curvature parallel to the base. The deflector plate base may be bolted or otherwise affixed to the base of the arm 12. When affixed, the deflector plate arm extends toward the distal end 34 of the arm, and curves about the sidewall of the middle tube 25. Typically, the deflector plate is attached to the arm such that sludge exiting the inlet strikes the underside of the deflector arm and flows therealong, spreading along the length of the deflector arm and accordingly along the circumference of the arm 12. Thus, the deflector plate provides an alternate structure for distributing sludge along the circumference of the arm.

Returning to the discussion of the diffuser 64, sludge passing through the hole 72 in the bottom diffuser plate 66 and the gap 74 proceeds upward through the interior chamber 22 defined in the arm 12. As previously mentioned, the sludge spreads about the circumference of the arm 12 after impacting the diffuser 64. Similarly, after exiting the hole 72, centrifugal force generated by the arm's motion may distribute sludge about the circumference of the top diffuser plate 68. The maximum segment of the top diffuser plate's circumference around which sludge may spread is defined by the diffuser clip(s) 70. In the present embodiment, the diffuser clip(s) 70 cover approximately 180 degrees of the top diffuser plate circumference.

In the present embodiment, two tubes 25, 26 extend longitudinally within the interior chamber 22. The inner tube 26 and middle tube 25 are concentrically positioned within the interior chamber 22, with the longitudinal axes of the tubes and the arm aligned. Spaced about the exterior of the middle tube 25, in region 28, are one or more radial fins 36. Each fin 36 extends from the exterior of the middle tube 25 nearly to the interior wall of the arm 12 (which effectively forms the middle tube 25). In the present embodiment, and as shown to best effect in the cross-sectional view of FIG. 4, a relatively small annular space 76 remains between the outer edge of each fin 36 and the arm's inner sidewall 24. Adjacent radial fins 36 and the outer sidewall of the middle tube 25 cooperate to form arm channels 78 within the outer flow region 28. The arm channels direct sludge flow from the arm base to the distal end 34. The arm channels 78 additionally reduce swirling or Coriolis effects in the sludge as it migrates along the arm, by reducing the lateral area in which such swirling may occur. Coriolis effects in flowing sludge may cause imbalances in the arm 12, high flow velocity for sludge, and sludge swirls about a point in the arm, rather than freely flowing along the arm's longitudinal axis.

Figure 5:
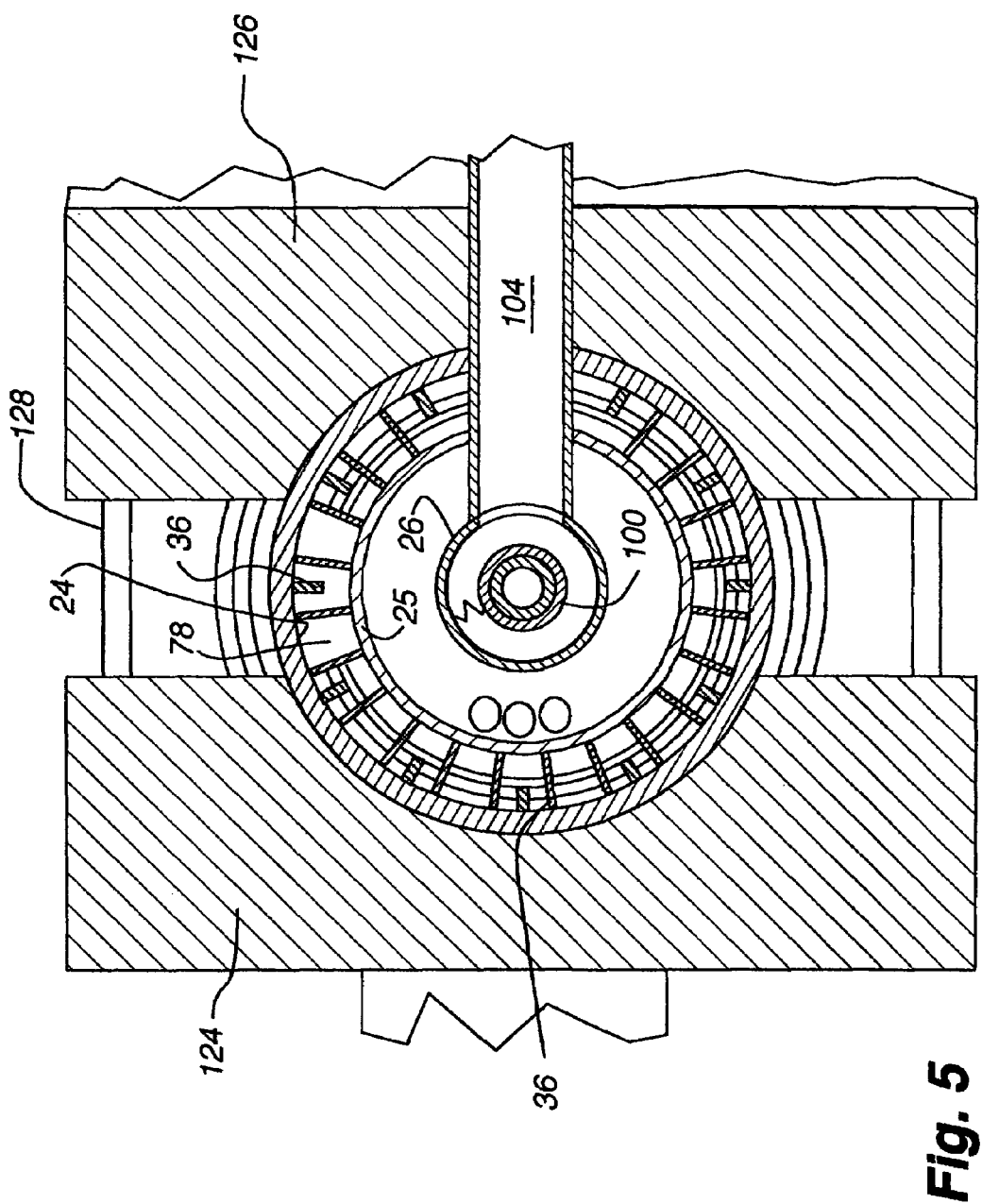
FIG. 5 depicts a cross-sectional view of an alternative arm, similar to that shown in FIG. 4, but depicting two sets of radial fins.
Figure 6:
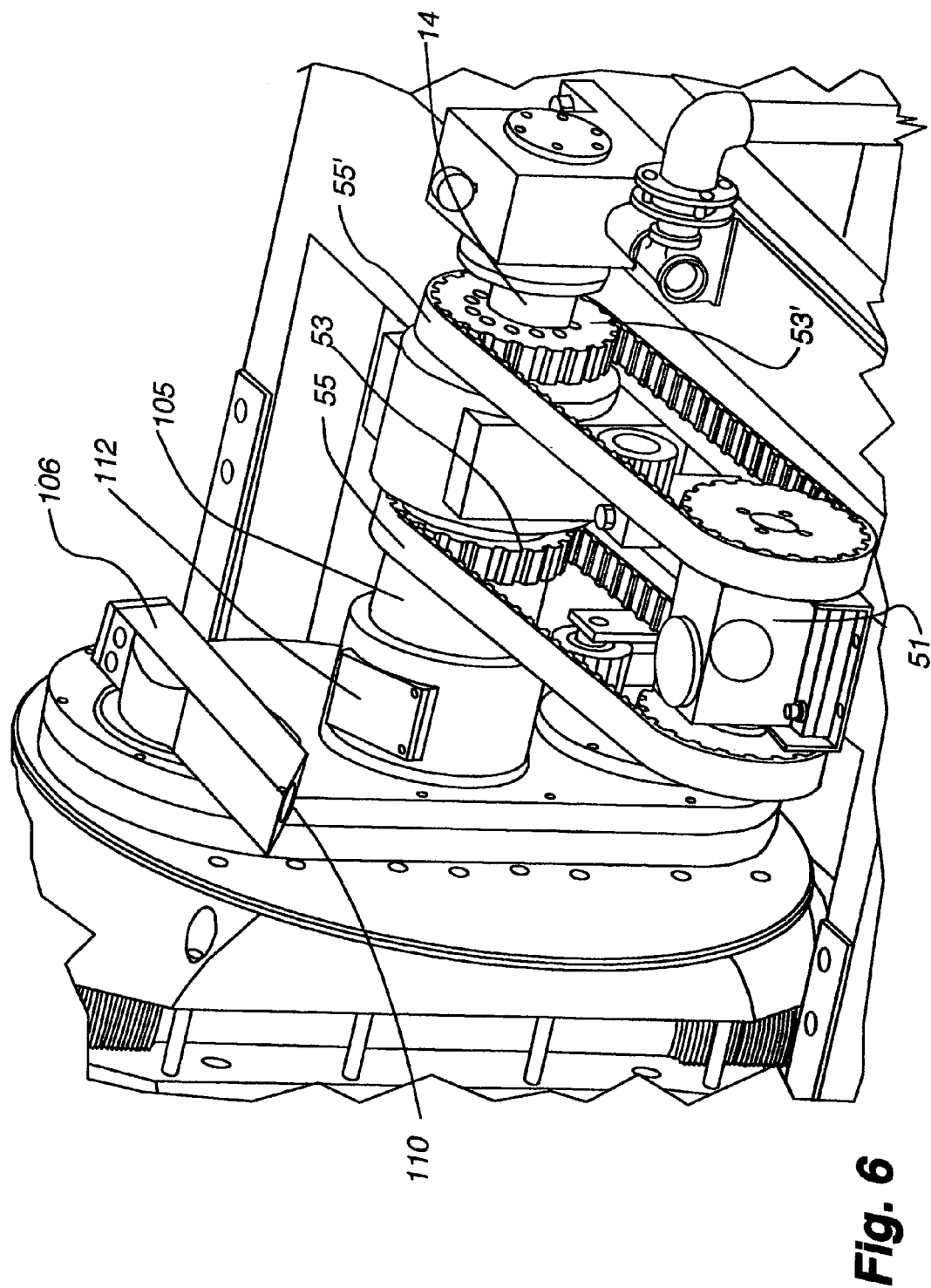
FIG. 6 depicts a solids exit arm of the centrifuge in an open position.
Figure 7:
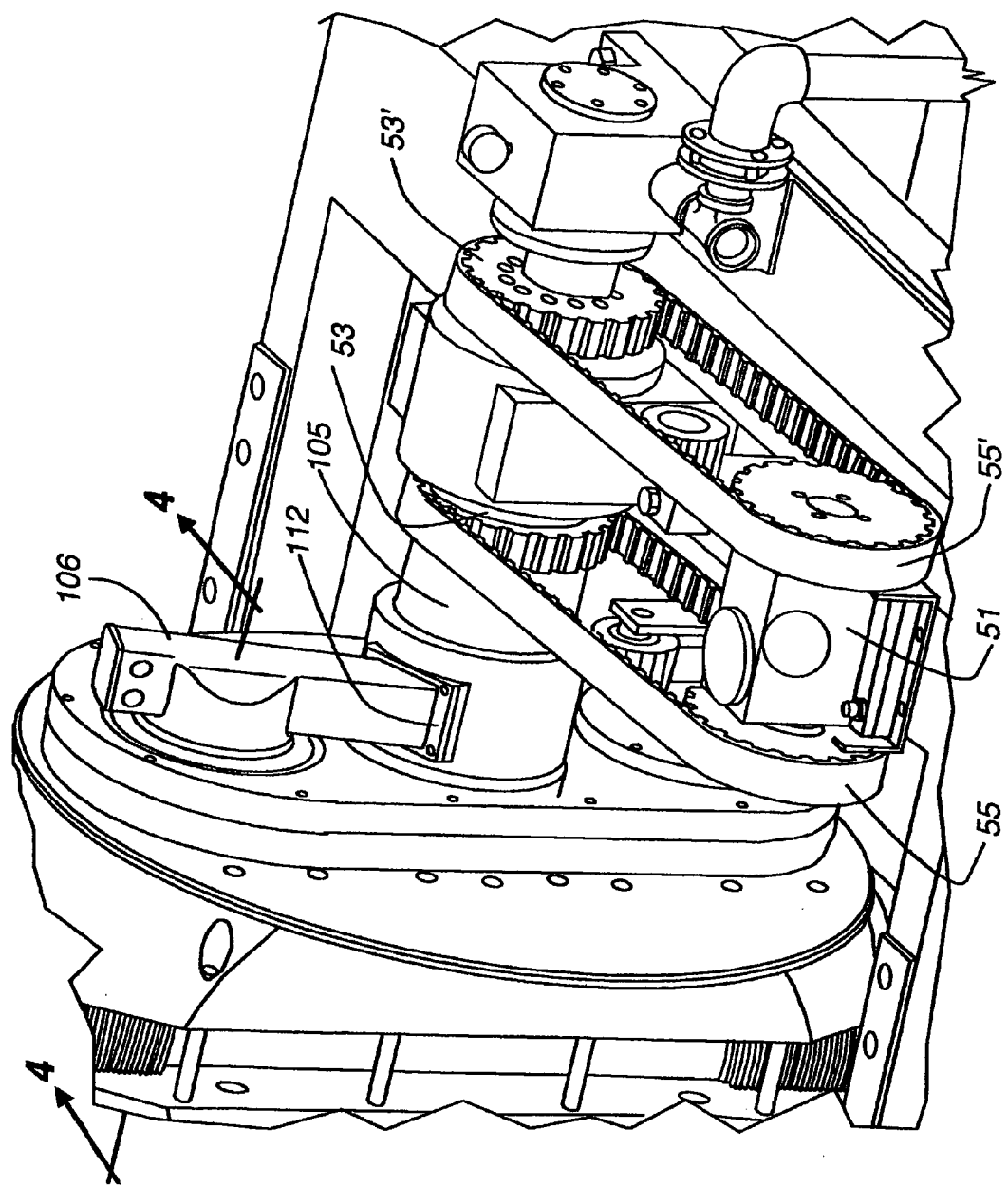
FIG. 7 depicts a solids exit arm of the centrifuge in a closed position.

Certain embodiments may place the fins 36 on the inner sidewall 24 of the arm 12, as opposed to on the exterior of the middle tube 25. Such a change would nonetheless cause the fins and flow paths to operate as previously described. Yet another embodiment may place one or more fins 36 on both the inner sidewall 24 of the arm 12 and the exterior of the middle tube 25, as shown in FIG. 5. This embodiment may include a one-to-one correspondence between fins on the middle tube and those on the arm sidewall (i.e., for each fin on the arm sidewall, one is present on the middle tube), or may place fins 36 on the arm sidewall and middle tube in varying ratios. For example, and as shown in FIG. 5, each fin 36 attached to the arm's inner sidewall corresponds to two fins attached to the outer sidewall of the middle tube 25. The combination of fins on each surface may define a serpentine pattern when viewed in cross section, and may serve to more finely channel sludge through the arm channels 78. This may also reduce the aforementioned coriolis effect.

It should be noted that fins 36 may be placed within the middle tube 25, inside the second flow path 30. If fins 36 are present in the second flow path 30, they may provide the same benefits discussed above insofar as additional separation of solids and liquids may occur in the second flow path.

Since approximately half of the top diffuser plate's circumference is covered by one or more diffuser clips 70 in the present embodiment, sludge is free to travel into the arm channel 78 adjacent the uncovered portion of the top diffuser plate 68. In the present embodiment, the uncovered portion is situated along the forward edge of the arm 12, with respect to the arm motion (the "leading edge"). The arm 12 moves as a unitary body, while the sludge inside the arm moves less uniformly. The coriolis effect acting on the sludge generally forces sludge to gather at a particular circumferential point on the arm; diffusing and channeling the sludge with the diffuser 64 and/or fins 36 may prevent or minimize coriolis effects. Thus, the sludge moves back from the leading edge of the top diffuser plate 68 and middle tube 25 (relative to the motion of the arm 12). Accordingly, the arm channels 78 located along the rearmost portion of the interior chamber 22 with respect to the arm motion (the "trailing edge") also accrete and channel sludge. The annular space 76 permits migration of sludge from channels along the leading edge to channels along or closer to the trailing edge.

The pump 27 may at least partially drive sludge along the arm towards the distal end 34. (Likewise, centrifugal force caused by rotation of the arm 12 may at least partially drive sludge along the arm in this fashion.) As previously mentioned, the configuration of the middle tube 25 and radial fins 36 channel the sludge upward along the arm channels 78. The fins and associated channels generally prevent clumping of sludge along the arm's longitudinal axis, reduce regions of higher velocity flow, increase residence time for particulates and sludge within the arm 12, reduce fluid shear, and enhance steady, uniform sludge flow.

It should be noted that the pump 27 may supply water to the arm, rather than sludge. The water may flow throughout the centrifuge and arm(s) in the manners described herein, generally mimicking sludge flow with the notable exception that the water is typically not separated into a heavier and lighter material. The water does, however, flow through both solids and liquid exits. This may be desirable, for example, when the centrifuge and/or arm is to be cleaned.

It should be noted that the middle tube 25 is made of a strong, porous material. The porous material may or may not be flexible, but in any event is sufficient to withstand stresses from sludge and arm motion. The middle tube 25 may be made, for example, of a sintered or etched steel. The middle tube 25 may also be provided with reinforcing struts, bands, or other structural members (not shown) to brace the tube against centrifugal loading. In certain embodiments, only a portion of the middle tube 25 may be porous. For example, the base and distal ends of the middle tube may be effectively non-porous, with the middle being porous. Likewise, the entirety of the tube may be non-porous. A one-way membrane may be used to ensure liquid does not pass radially outward through the wall of the middle tube. The middle tube 25 sidewall, for example, may be made of a ceramic or fabric impregnated with a water-proof chemical or material permitting liquid to flow through from the outside to the inside of the tube, but not in the opposing direction. Alternately, the pores may be conical and have a larger diameter along the outer sidewall than the inner sidewall, thus being sized to permit flow in one direction but prevent backflow.

Yet other embodiments may rely on the pressure generated by sludge pumped into the arm and along the outer flow path to prevent backflow through the pores of the middle tube. That is, the pump forces sludge into the arm 12 under pressure. This pressure, in addition to driving sludge along the length of the arm, may drive some liquid components of the sludge through the pores (or membrane) of the middle tube 25. The same pressure, insofar as it drives liquid through the middle tube's porous segment from the outer flow region to the middle flow region, may prevent liquid from flowing in reverse.

As used herein, the term "porous" encompasses any membranous material permitting liquid flow therethrough.

It should be noted that alternative embodiments of the invention may employ an middle tube 25 having a solid, non-porous sidewall. In such case, the sludge would flow along the first flow path 28 (between the inner sidewall 24 of the arm 12 and outer sidewall of the middle tube 25), to the distal end 34 of the arm, and down the second flow path 30 defined between the inner sidewall of the middle tube 25 and outer sidewall of the inner tube 26. Although the separation of liquid and solid may take slightly longer if the middle tube sidewall is not at least partially porous, such embodiments nonetheless operate to permit liquid/solid separation.

As sludge flows across the porous surface of the middle tube 25 (typically along the aforementioned arm channels 78), at least some of the liquid component of the sludge may pass through the porous surface and into the interior of the middle tube 25 (i.e., the middle flow region 30). The porous segment of the middle tube 25 is sized to permit at least a portion of liquids to pass therethrough, but prevent the passage therethrough of solids of the size typically found in sludge. The remaining liquid, along with the solids in the sludge, travel from the inlet 20, along the length of the arm 12, to the distal end 34 of the arm. The solids collect at the distal end, typically abutting the conical sidewall 80 of the end cap 82.

Still with respect to FIG. 2A, as the solids build and dry along the conical sidewall 80, they fill some portion of the interior chamber 22 in adjacent end cap 82. The heavier solids are typically driven against the conical sidewall and/or end cap to dry, while the liquid segment of the sludge remains free to move. Accordingly, the liquid flowing along the outer sidewall of the middle tube is forced along a return channel (i.e., middle flow region 30) defined between the middle tube 25 and inner tube 26. Unlike the middle tube 25, the inner tube 26 is not necessarily porous. Accordingly, liquid entering this channel 86 is confined between the tubes.

As previously mentioned, an outlet channel 88 in region 30 leads from the base of the arm 12 into an outlet passage 90. The liquid portion of the sludge moves along the return channel 86, entering either from the distal end 34 of the arm or through the porous sidewall of the middle tube 25. The liquid migrates to the base of the arm 12, through the outlet channel 88, and ultimately into the outlet passage 90. The outlet passage extends along the longitudinal axis of the main shaft 14, on the side opposite the main shaft passage 19. The outlet passage 90 may be ring-shaped in lateral cross-section, encircling the drive shaft 118. The outlet channel 88 for each arm 12 feeds into the single outlet passage 90. In alternative embodiments, each outlet channel 88 may feed a separate, unique outlet passage 90.

Placed in-line along the outlet passage 90 is an outlet valve 94, as shown in FIG. 2B. The outlet valve 94 is typically capable of assuming a variety of positions, ranging from completely closed to completely open. By adjusting the percentage of the outlet passage 90 throttled by the outlet valve 94, the backpressure in the outlet passages 90, outlet channels 88, and accordingly connected arms 12 may also be adjusted. In alternate embodiments employing two outlet passages 90 (one for each arm), a separate valve 94 may be provided for each outlet passage, permitting independent control of backpressure in each arm.

Changing the backpressure inside the arms 12 by manipulating the sealing of the valve 94 has several effects. First, as flow is restricted and pressure increased, sludge is driven more thoroughly into the arm, minimizing or eliminating the presence of air pockets. Filling the interior of the arm 12 with sludge permits more efficient separation of solids from liquids, insofar as air pockets are not present to disrupt sludge flows, pressure differentials, or solids migration. Similarly, increasing backpressure in the outlet passage 90 increases pressure within the arm 12, which leads to greater compaction of solids within the arm. As the solids compact more strongly at the distal end 34 of the arm beneath the end cap, liquid is forced out of the compacted material. Thus, the solids exiting the arm 12 are, in turn, typically drier as backpressure is increased. Finally, it should be noted that increasing the arm pressure by throttling the valve 94 yields a higher pressure differential between the arm interior and atmospheric pressure at the outlet of the solids exit arm 106. Thus, and as discussed in more detail below, solids exit the arm more rapidly when the valve 94 is throttled.

Returning to the view of FIG. 2A, disposition of solids within the arm will now be discussed. As previously mentioned, the solids tend to collect beneath the end cap 82. One or more scrapers 96 extend parallel to the conical walls of the end cap, and further extend to the end of the angled portion of the end cap. The scrapers 96 are attached to the shaft 98 of an auger 100. As the auger 100 turns, the scrapers 96 rotate about beneath the inner sidewall of the end cap 82. As the scrapers rotate, they mix the solids collected and dried beneath on the interior of the end cap 82. The broken solids may then be more easily moved along the arm to a solids exit 102. The scrapers 96 may include one or more prongs, projections, or protrusions extending therefrom to facilitate the mixing, chopping or breaking of solids. One such projection is shown, for example, in FIG. 11.

Still with respect to FIG. 2A, the auger 100 is disposed within the inner tube 26, in the inner flow region 32. The auger 100 includes flighted blades 102 running along at least a portion of the auger shaft 98, and potentially the entire shaft (as shown in FIG. 2A). The auger blades may serve not only to mix or chop solids into a more manageable size for transport along the interior of the inner tube 26, but also to lift and move solids along the inner tube interior. Additionally, the auger 100 may act to restrict flow of solids through the inner tube 26 and to the exit arm 106 by occupying space within the inner tube that would otherwise accept solids. This flow restriction may permit regulation of solid flow through the inner tube 26 and out the exit arm 106. This, in turn, may lengthen the residence time of solids in the arm and permit additional separation of liquids from solids, as well as increase dewatering of the solids by compaction. Likewise, the flow restriction may prevent too much solid material from rapidly exiting the arm during operation of the embodiment. In some embodiments, the auger may be flighted along only a portion of its shaft, typically near the end cap 82. Such embodiments do not require the auger blades 102 to transport solids along the entirety of the arm 12, but instead only to break up solids caked at the distal end 34.

Figure 9:
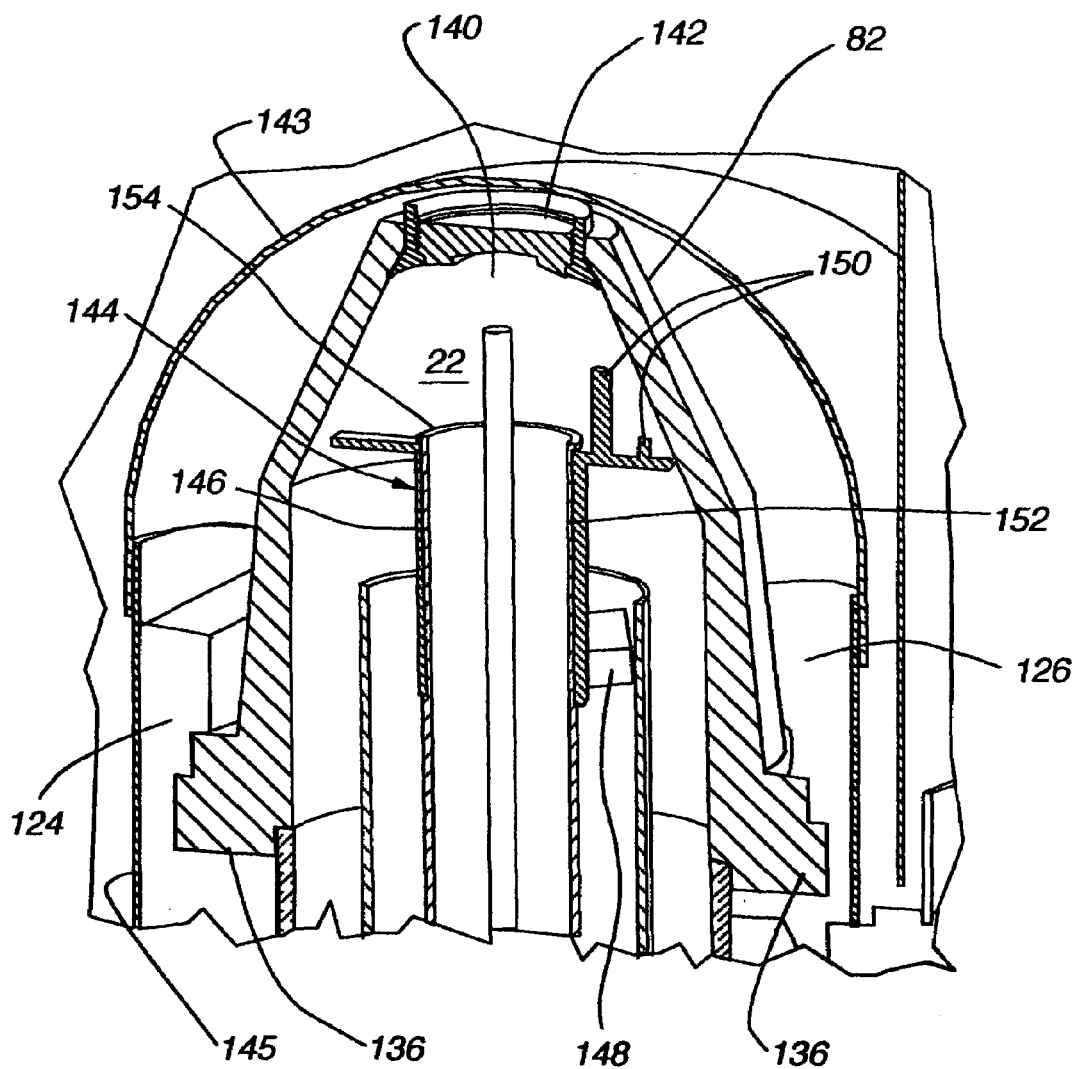
FIG. 9 depicts a partial cross-sectional view of an alternate embodiment of an arm of the centrifuge employing a mixer.

The auger 100 may include an auto-stirrer or mixer, as shown in FIG. 9. The mixer 144 generally mixes solids that may collect beneath or adjacent to the end cap 82, as discussed in more detail below.

The solids exit 104 is positioned approximately two-thirds of the distance from the distal end 34 to the base of the arm 12. In the present embodiment, the solids exit 104 takes the form of a passage extending perpendicularly from the longitudinal axis of the arm 12, communicating with both the interior of the inner tube 26 and atmosphere. Certain embodiments may enclose the outer aperture 110 of the solids exit 104 in a shroud or catch-basin maintaining approximately atmospheric pressure instead.

The solids exit 104 terminates in a pivotable exit arm 106 (see FIGS. 2A and 5–7). The exit arm 106 may be contained in a shroud (not shown), as discussed immediately above. The exit arm 106 further may be pivoted about a pivot point 108, and may rotate from a completely closed position (shown in FIG. 7) to a completely open position (shown in FIG. 6), as well as occupying any position between these two extremes. As previously mentioned, a phase shifter 51 may adjust the positioning of the exit arm 106 by independently driving each of two sheaves 53, 53' (via belts 55, 55') such that the relative position of the sheaves changes. Since one sheave 53' is affixed to the main shaft 14 and one sheave 53 to a shaft 105 connected to a drive gear (not shown) for rotating the exit arm 106, changing the relative angular alignment pivots the arm accordingly.

When the exit arm 106 is in the fully closed position, the outer aperture 110 rests against a seal pad 112. The seal pad 112 at least partially prevents solids from passing through the outer aperture, and thus from passing through the solids exit 104 or exit arm 106. The seal pad may not form a perfect seal with the exit arm 106, and thus may permit at least a trickle of solids to exit. Alternative embodiments may employ a seal pad 112 capable of forming a perfect or near-perfect seal with the exit arm 106, thus preventing any solids from exiting when the outer aperture 110 rests on the seal pad.

As the exit arm 106 pivots about the pivot point 108, its rotation moves the outer aperture 110 in an arc. One vector of this arcuate motion shifts the outer aperture up and down along the longitudinal axis of the arm 12. That is, a point along the arm's longitudinal axis parallel to the outer aperture 110 varies as the exit arm 106 pivots.

As previously mentioned, a pressure gradient exists along the longitudinal axis of the arm 12, due to centrifugal force acting on the arm and its contents. The pressure in the arm is lowest at the base of the arm, and highest at the distal end 34. Generally, the pressure in the exit arm 106 roughly matches the pressure in the arm at the longitudinal plane in which the outer aperture lies. Accordingly, as the outer aperture moves from the base of the arm 12 to the distal end 34, the pressure differential between the exit arm 106 and outer aperture 12 (i.e., atmosphere) increases and solids exit the arm 12 more rapidly. By contrast, as the outer aperture 110 moves toward the arm base, this pressure differential decreases and solids exit the arm more slowly. A second valve (not shown) may be placed on the solids exit 104 or pivotable exit arm 106 to provide finer control of the rate of solids exiting the arm, as well as backpressure in the arm. Alternatively, such a valve may take the place of the exit arm 106 entirely.

Accordingly, the pressure differential between the interior chamber 22 and the outer aperture, which is at atmospheric pressure, changes with the pivot of the exit arm 106. This, in turn, may alter the magnitude of the negative dam discussed and defined below.

As pressure differential between the interior chamber 22 and the outer aperture 110 increases, solids flow more quickly through the solids exit 104, exit arm 106, and outer aperture. This generally occurs as the height of the outer aperture is increased. Thus, increasing the pressure differential causes solids to more quickly evacuate the arm 12 interior. However, increasing the pressure differential may also cause solids to exit with a higher liquid content, insofar as the solids spend less time in the arm 12 and thus have less exposure to the separation of liquid created in the arm.

Additionally, varying the pressure between the interior chamber 22 and the outer aperture 110 permits solids to flow from the interior chamber, through the solids exit 104, into the exit arm 106, and out the outer by following the pressure gradient. The pressure gradient enhances solid flow out of the arm. The decreased pressure at the outer aperture 110 (as compared to the interior chamber 22 and particularly the portion of the chamber adjacent the end cap 82) provides a force to move the solids out of the interior chamber. Accordingly, the present embodiment need not employ the auger 100 to drive solids along the interior of the inner tube 26. Rather, the auger 100 may be used solely to mix the solids and maintain them in a fluid-like state for easier flow, and thus may be flighted along only the portion of the auger shaft near the end cap 82. Alternate embodiments may employ a fully-flighted auger to assist the pressure gradient in moving solids out of the arm 12, while other embodiments may not employ an auger.

Generally, a negative dam enhances solid flow through the exit arm by placing the exit arm 106 closer to the end of the arm 12 than the liquid or centrate exit 88. That is, the liquid exit 88 is located closer to the main shaft 14 and center of rotation of the arm 12 than is the solids exit arm 106. Accordingly, liquids located closer to the centerline of rotation of the arm 12 than the solids in the exit arm 106 may exert pressure on the solids. This greater pressure acts to force solids out the exit arm 106 and provides greater compaction of the exiting solids.

It should also be noted that alternative embodiments of the present invention may employ a solids exit arm 106 that is rotationally fixed, and thus has its outer aperture 110 located at a constant point along the length of the arm 12.

Yet other embodiments may employ a valve affixed to the exit arm 106 to regulate flow therethrough. In such an embodiment, the exit arm 106 may be rotationally fixed (with respect to the arm 12) or may rotate as described above. Alternatively, the exit arm 106 may be omitted and replaced by the valve, in which case the valve is affixed to the outside of the arm 12. Another embodiment may employ progressive cavity pump elements, such as a rotor and stator, to control or enhance flow through the exit arm 106. Still another embodiment may place an inflatable bladder in the exit arm 106 to regulate or "pinch off" solid flow through the exit arm. Any other form of flow restriction device or flow enhancement device may be used inside or in conjunction with the exit arm 106 to regulate solid flow therethrough.

In the present embodiment, the auger 100 may be affixed at one end to a stabilization rod 114, and unfixed at the end proximate the end cap 82. The stabilization rod 114 projects from a pedestal 116 and is shown in FIG. 8. (The auger 100 is not shown in FIG. 8 solely for purposes of clarity.) The pedestal 116 has approximately the same outer diameter as the inner tube 26. This pedestal 116 is attached to the inner tube and forms the base of the passage defined within the inner tube and leading to the solids exit 104. The bottom of the solids exit 104 is generally aligned with the top of the pedestal 116. In alternative embodiments, the auger 100 may be affixed to the end cap 82 or another structure proximate the distal end 34. Affixing the auger 100 at both ends may impart additional stability and reinforcement to the arm structure.

As shown to best effect in FIG. 8, the stabilization rod 114 extends into, and is anchored within, the main shaft 14. In the present embodiment, the augers 100 are driven by a motor and gear drive train. The motor is typically an electric motor, although other motors could be used. The motor and gear drive are typically located outside the arm 12 and main shaft 14, and thus may be serviced without requiring any portion of the embodiment to be opened. A single motor is typically used to drive both augers simultaneously. A drive shaft 118 extends along a portion of the main shaft 14 on the output side, as shown to best effect in FIG. 8. The drive shaft rotates a bevel gear 120, which in turn rotates a drive gear 122. The single drive gear 122 turns the stabilization rod 114, which in turn rotates one auger 100 in each arm 12. FIG. 8 depicts the stabilization rod extending into a single arm for purposes of clarification. In actuality, the stabilization rod 114 extends into both arms 12 (if two arms are present). By employing an electric motor instead of a hydraulic motor, the overall power required to operate the embodiment may be reduced and the auger's rotational speed may be finely adjusted.

Returning to FIG. 2A, as previously mentioned sludge enters the arm 12 through the inlet 20 (placed between the inner sidewall of the arm 12 and the outer sidewall of the middle tube) and travels along the exterior of the middle tube 25 to the distal end 34 of the arm. During this motion, liquid components of the sludge may pass through the porous sidewall of the middle tube 25 and into the middle flow region 30. Similarly, liquid may separate from the solids along the flow to the distal end of the arm 12 and then enter the middle flow region. Accordingly, the outlet 88 is formed in the base of the arm 12 between the inner and middle tubes 26, 24.

Certain embodiments, however, may reverse the relative locations of the inlet 20 and outlet 88. That is, the inlet 20 may introduce sludge into the arm 12 between the inner tube 26 and middle tube 25. Sludge may flow through the middle flow region 30, with liquid passing through the porous sidewall of the middle tube 25 to the outer flow region 28. Solids may collect at the distal end 34 of the arm, as previously described. The solids may be channeled (either through a combination of gravity and pressure, or by the auger 100) to the inner flow region 32. Liquid, on the other hand, may flow along the outer flow region 28 to the base of the arm and out the outlet 88. Such changes to the location of the inlet 20 and outlet 88 may be made without unduly affecting the operation of the embodiment. Certain other structural changes may also be made to the embodiment to take the positioning of the outlet 88 and inlet 20 into account. For example, the diffuser 64 may be placed between the inner tube 26 and middle tube 25.

Returning to the view of FIG. 1b, it can be seen that the exterior structure of the arm 12 is formed in the present embodiment from the end cap 82, a left clamshell 124, a right clamshell 126, and several bolts 128 affixing the clamshells to one another. When assembled, the clamshell structure supports the entire structural load of each arm 12. The relatively large surface area of each clamshell 124, 126 minimizes the stress loading on any given portion of the clamshell. In other words, since the centrifugal force exerted on the arm 12 (and thus resisted by the clamshell) is minimally variable or even a constant, the pressure exerted on the clamshell decreases as the clamshell's surface area increases. Thus, the clamshell is likely stronger than a narrower or smaller arm structure having less surface area.

Additionally, and as best shown in FIG. 2A, the end cap 82 is shaped like a first cone 129 stacked atop a second cone 131 (a "double cone"). The conical shape of the end cap 82 is sandwiched between the left and right clamshells 124, 126, in mating grooves 128, 130, when the arm 12 is assembled. Thus, the wider base of the conical end cap 82 is contained within the assembled clamshell. Since the left and right clamshell grooves 128, 130 abut the second conical portion 131 along its length, the grooves widen towards the base. Accordingly, the end cap 82 cannot be removed from the assembled arm 12 without removing the bolts 128 and separating the clamshells 124, 126 from one another. Thus, the conical shape of the end cap and grooves formed in the clamshell resist decoupling of the end cap from the arm during operation of the arm.

As also shown in FIG. 2A, the second conical portion 131 of the end cap 82 has a saw-toothed outer sidewall. Similarly, the mating grooves 128, 130 have complementary saw-tooth formations formed thereon. The combination of the end cap's saw-tooth outer sidewall and grooves not only forms a more secure mating between the components than if each were smooth, but also distributes stress on the arm 12 and end cap 82 across a greater surface area.

FIG. 9 depicts an alternate end cap 82 and clamshell 124, 126 structure. In this alternate embodiment, the saw-tooth outer sidewall of the end cap 82 is replaced by one or more annular protrusions 136. These protrusions are received in grooves 128 formed in the left and right clamshells 128, 130, and serve to secure the end cap to the clamshell.

Still with respect to FIGS. 1b, 2, and 9, the end cap 82 may include a port 140 formed therein at the distal end 34 of the arm 12. The port 140 is typically covered by a port cover 142 secured to the end cap 82. The port cover 142 may be removed to expose the port 140, which in turn may permit access to the interior chamber 22 of the arm without requiring the arm be disassembled.

Figure 10:
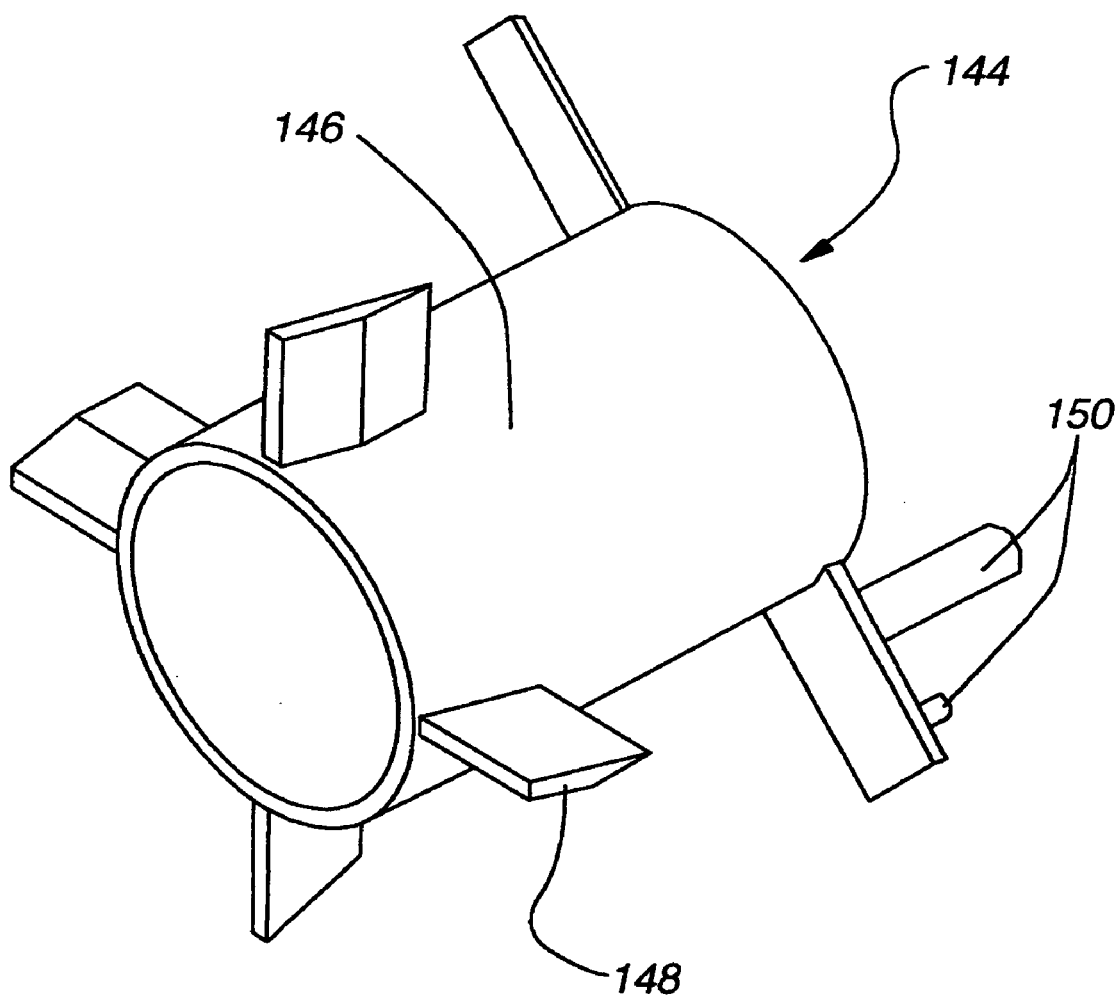
FIG. 10 depicts a perspective view of the mixer of FIG. 9.

Alternative embodiments may replace the auger 100 with another structural element designed to mix solids collected beneath the end cap 82. For example, and as shown in FIGS. 9 and 10, a mixer 144 may be employed. The mixer may be formed of any material having a density equal to or near equal to water, and consists of a hollow, cylindrical body 146 having one or more vanes 148 and mixing elements 150 projecting therefrom. The inner diameter of the body 146 is slightly less than the outer diameter of the inner tube 26. An annular groove 152 is formed in the distal portion of the inner tube 26 and the mixer 144 seats therein. A lip 154 prevents the mixer 144 from moving off the inner tube 26. Thus, the mixer 144 rests between the aforementioned lip 154 and a seat 156 defined at the end of the annular groove 152 opposing the lip. (In alternate embodiments, the body's inner diameter may match or slightly exceed the inner tube's outer diameter, and the lip and groove may project outwardly from the inner tube's outer sidewall to contain the mixer.) The vanes 148 may be replaced by a propeller in alternative embodiments, or may assume shapes different than those shown in the figures.

The mixer 144 is free to rotate about the inner tube 26 while seated in the annular groove 152. As liquid flows along the middle flow region 30, it impacts the vanes 148. The vanes are offset from the longitudinal axis of the mixer 144 at an angle. Thus, when the liquid impacts the vanes 148, the mixer 144 rotates about the inner tube 26. This rotation, in turn, drives the mixing elements 150 about the space beneath the end cap 82. The mixing elements may thus chop the sludge solids that cakes beneath the end cap, keeping the solids moving and available for disposal through the inner flow region 32.

As also shown in FIGS. 2A and 9, the angle of the first conical section 129 of the end cap 82 is relatively steep. The sidewall of this first conical section 129 forms approximately a 25 degree angle with the longitudinal axis of the arm 12. The steepness of the arm cone 129 facilitates drying of the solids by more effectively funneling the solids to the arm's distal end 34, where the solids dry most effectively. Further, this creates a more uniform solid cake at the arm's distal end 34. The exact angle of the first conical section 129 may vary in alternative embodiments.

Further, FIG. 9 depicts an optional enclosure 143 that may cover the end cap 82 and arm 12. The enclosure 143 may be removed from an arm shell 145 that generally either encloses or extends from a sidewall of the arm. The enclosure 143 may, for example, be screwed, bolted, or otherwise affixed to the arm shell 145. Both the enclosure 143 and arm shell 145 are optional. The enclosure 143 and arm shell 145 have the additional effect of lowering wind resistance to the rotation of the arm 12.

Figure 11:
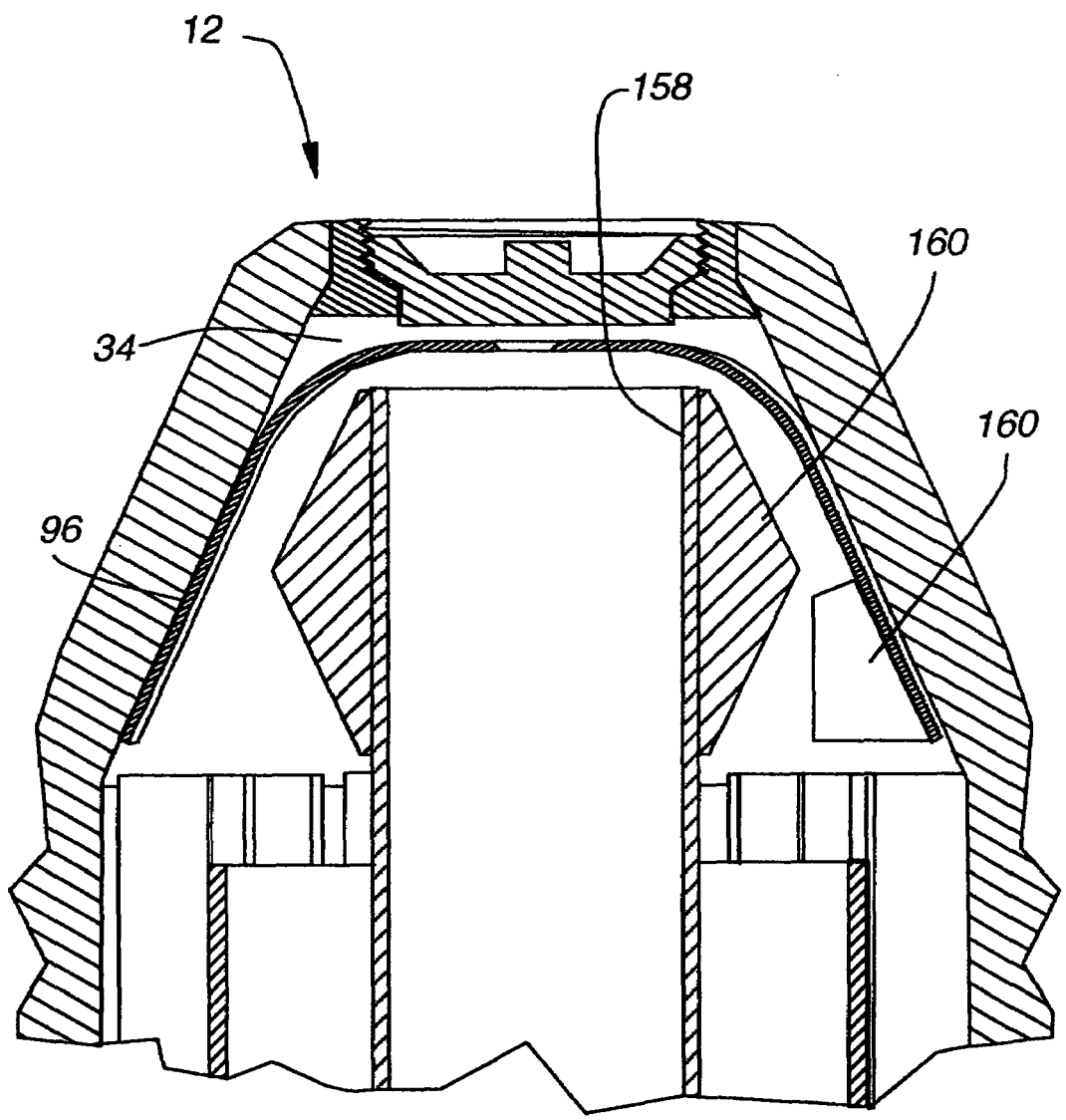
FIG. 11 depicts a partial cross-sectional view of a third embodiment of a centrifuge arm.

FIG. 11 depicts a cross-sectional view of the distal end 34 of an arm 12 of the present invention, showing an alternative embodiment 158 of the inner tube discussed above. A projection 160, shaped like two truncated cones having adjacent bases, is formed about the outer sidewall of the inner tube 158 at the tube's distal end. This projection 160 extends about the entirety of the inner tube 158 sidewall, and effectively minimizes the volume of the region in which solids may travel to the arm's distal end 34 and collect. This minimized area may in turn ensure material does not clump prior to reaching the distal end 34, and ensures a relatively uniform sludge flow to the distal end. Decreasing the wet material flowing to the distal end, in turn, maximizes the drying of solids within the arm and the evenness of the cake formed beneath the end cap. Drier solids and a more uniform cake equate to drier solids exiting the arm 12.

The scraper 96 may include a paddle 160 at one end. The paddle may push solids as the scraper 96 turns, evening out the solids that may otherwise clump on or near the projection 160 and facilitating an even solid flow to the arm's distal end 34. The scraper may be attached to an auger 100 (not shown in FIG. 11) or extension of the stabilization rod 114.

Figure 12:
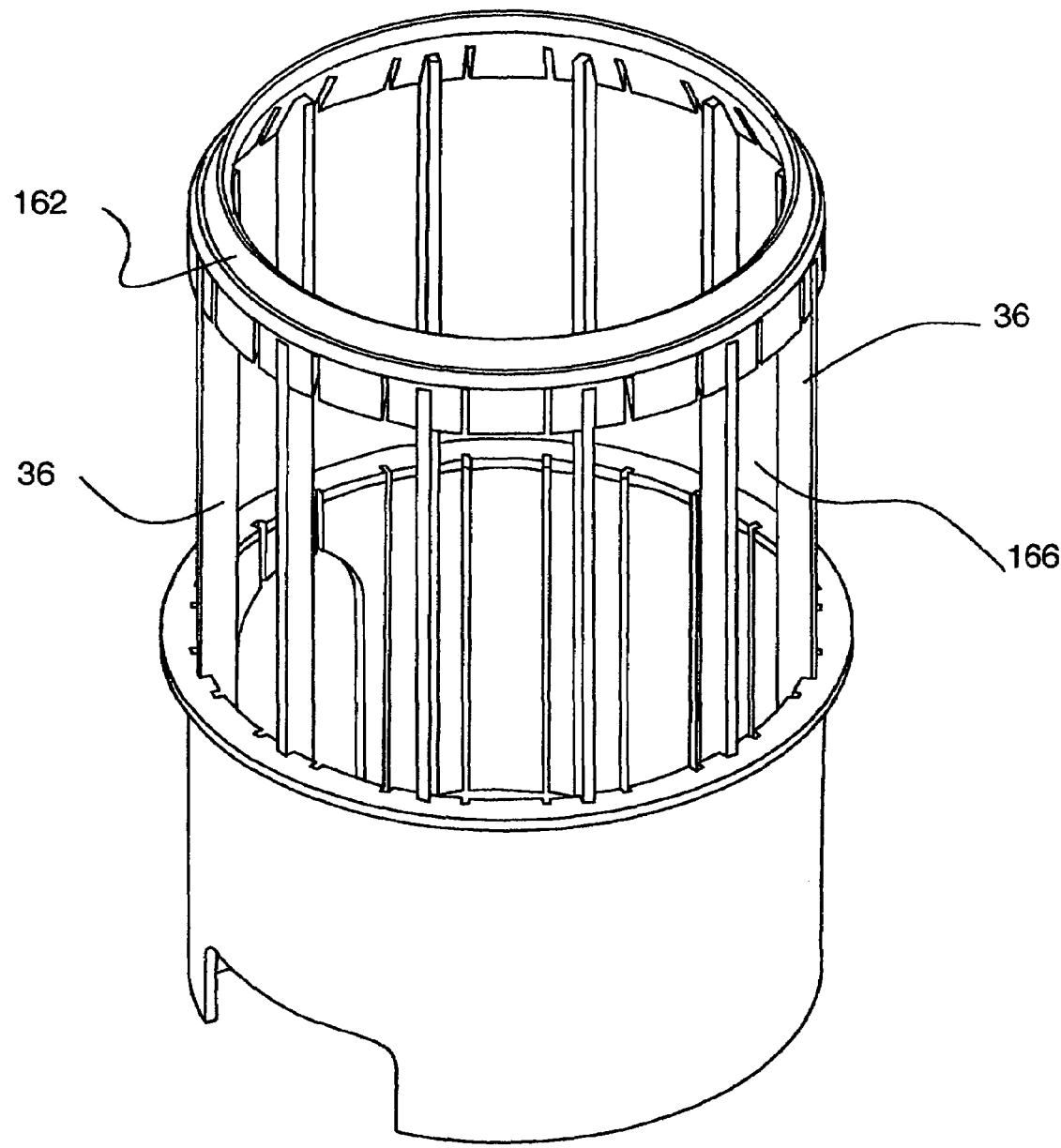
FIG. 12 depicts a partial isometric view of yet another alternative embodiment of a centrifuge arm, particularly depicting an alternative placement of radial fins.

A number of modifications to the centrifuge, and in particular the structure of the arm 12, may be made and are contemplated as aspects of the invention. For example, FIG. 12 depicts an alternative connection structure for the radial fins 36. Here, the fins 36 are affixed to a sleeve 162. The sleeve 162 may be slid over the middle tube 25 to align the fins and tube. In this manner, the manufacture of both fins 36 and tube 25 may be simplified.

The sleeve 162 may be formed with one or more bands 164 connected to each fin 36, and a gap 166 separating the bands. The gap 166 may be aligned with the porous portion of the middle tube 25, thus permitting liquid to flow through the porous portion as described above without interference from the sleeve 162. The sleeve 162 and fins 36 may be manufactured from any suitable material, including metal (such as steel) or a plastic.

Figure 13:
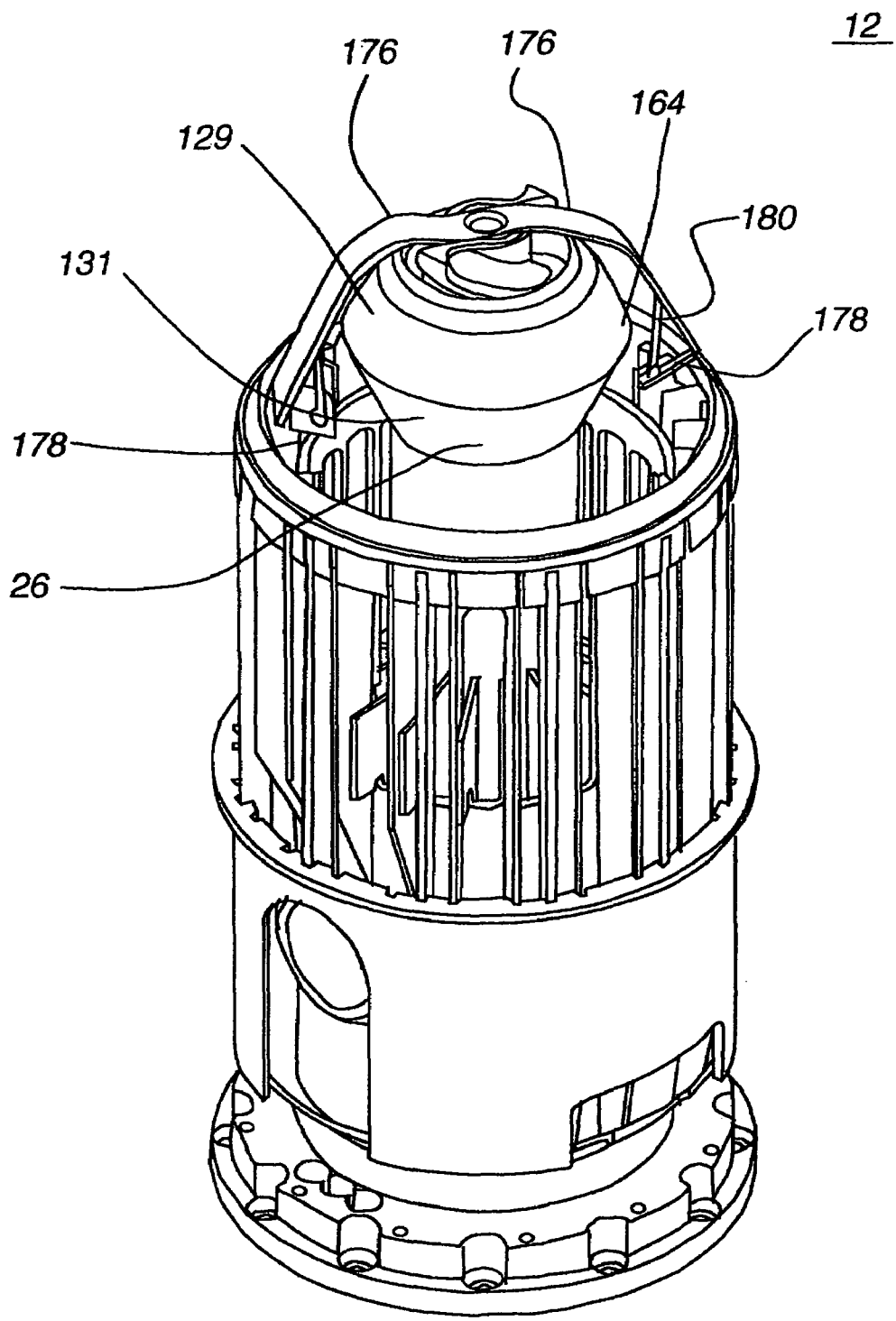
FIG. 13 depicts a partial isometric view of an end of a centrifuge arm, particularly depicting a modified end arm structure.

FIG. 13 depicts several additional modifications that may be employed in alternative embodiments of a centrifuge arm 12. For example, FIG. 13 depicts a modified double cone projection 164 that may sit beneath the end cap 82 (the end cap has been removed for illustrative purposes). In the modified projection 164, the double cone structure (made of the first truncated cone 129 and second truncated cone 131) is slid over the end of the inner tube 26 and fastened thereto by a clamp. The clamp may prevent the double cone structure 164 from disconnecting from the inner tube 26.

Alternative embodiments of the scraper blades 176 are also shown in FIG. 13. The scraper blades may include a plane 178 extending roughly perpendicularly from the scraper arm. The plane 178 may be reinforced by a rod or bar 180 to prevent the plane from buckling as it impacts sludge beneath the end cap 82. The plane 178 exerts additional force on sludge collected beneath the end cap, and may facilitate mixing, chopping, stirring, or moving the sludge.

Figure 14A:
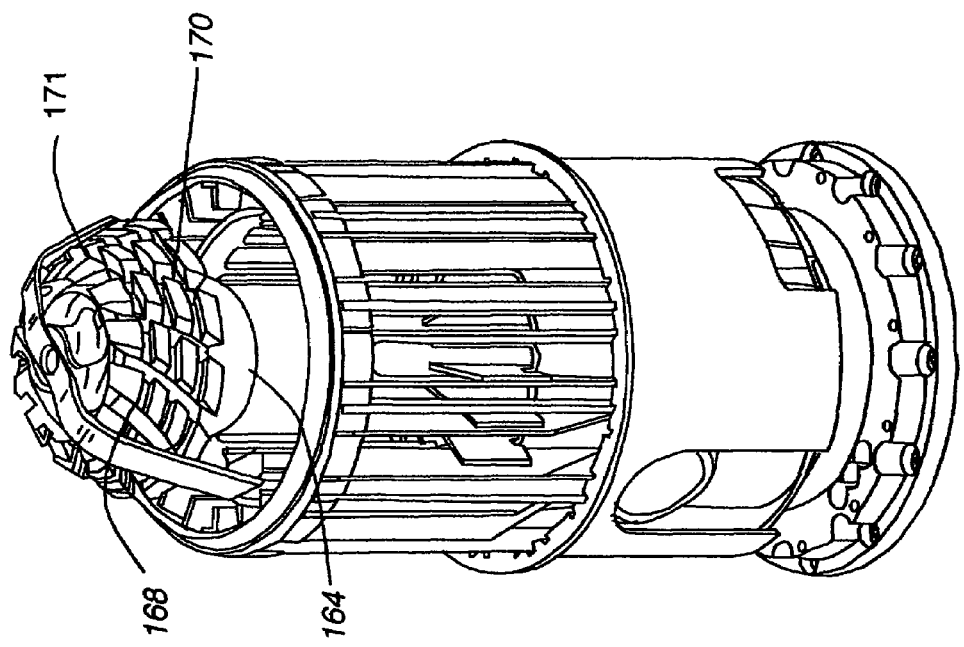
FIG. 14A depicts a partial isometric view of an end of another centrifuge arm, particularly depicting a modified end structure incorporating radial and transverse channels.
Figure 14B:
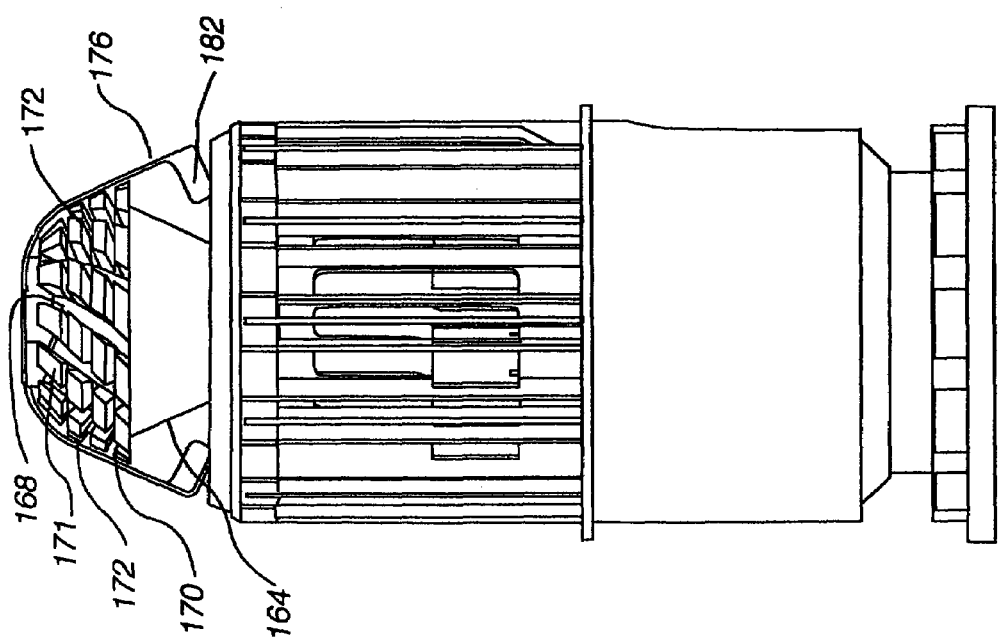
FIG. 14B depicts a side view of the centrifuge arm of FIG. 14A

Similarly, and as shown in FIG. 14B, the scraper blade 176 may have a three-sided rectangular shape 182 formed at its end instead of a plane 178. The rectangular shape 182 is hollow and exposed on three sides. The rectangular shape 182 acts as the plane 178 described above to facilitate motion of sludge. Alternative embodiments may employ different geometric shapes or partial shapes, such as pyramids, at the end of a scraper blade 176.

In the present embodiment, the scrapers described herein rotate counterclockwise. Alternative embodiments may rotate the scrapers and any associated prongs, projections, or portions in a clockwise manner.

As shown in FIGS. 14A and 14B, the projection 164 may include both radial and transverse channels 168, 170. The channels 168, 170 are defined by a series of partial sidewalls 171. The radial channels 168 direct sludge along the surface of the projection 164, towards the space beneath the end cap 82. The radial channels 168 may be angled or curved to extend their overall length, thus also extending the length of time required for sludge to flow through the channels 168. The channels 168 also facilitate the smooth flow of sludge along the projection 164.

The transverse channels 170 extend at generally right angles to the radial channels 168. Prongs 172 are formed on the scraper blades 174 and extend into the transverse channels 170. Generally, one prong 172 extends into each transverse channel 170. As the scraper blades 14 rotate in the manner described above, the prongs 172 move along the transverse channels. Accordingly, each prong also passes through each radial channel 168 in a full rotation of the scraper blades 14. As the prongs pass in and out of a radial channel 168, they cut and/or chop sludge resident in the radial channel. The chopped sludge then flows more easily along the arm 12. A certain amount of turbulence is formed by the interaction of the transverse and radial channels 170, 168. This turbulence facilitates chopping the sludge, rather than simply moving the sludge along the transverse channels 170 as the prongs 172 move therealong.

Additional tubes may also be employed by alternative embodiments of the present invention. For example, a third tube may encircle the outer and inner tubes, or may be positioned within the inner tube. Further, any such additional tube may be solid, porous, or a combination of both.

Figure 15:
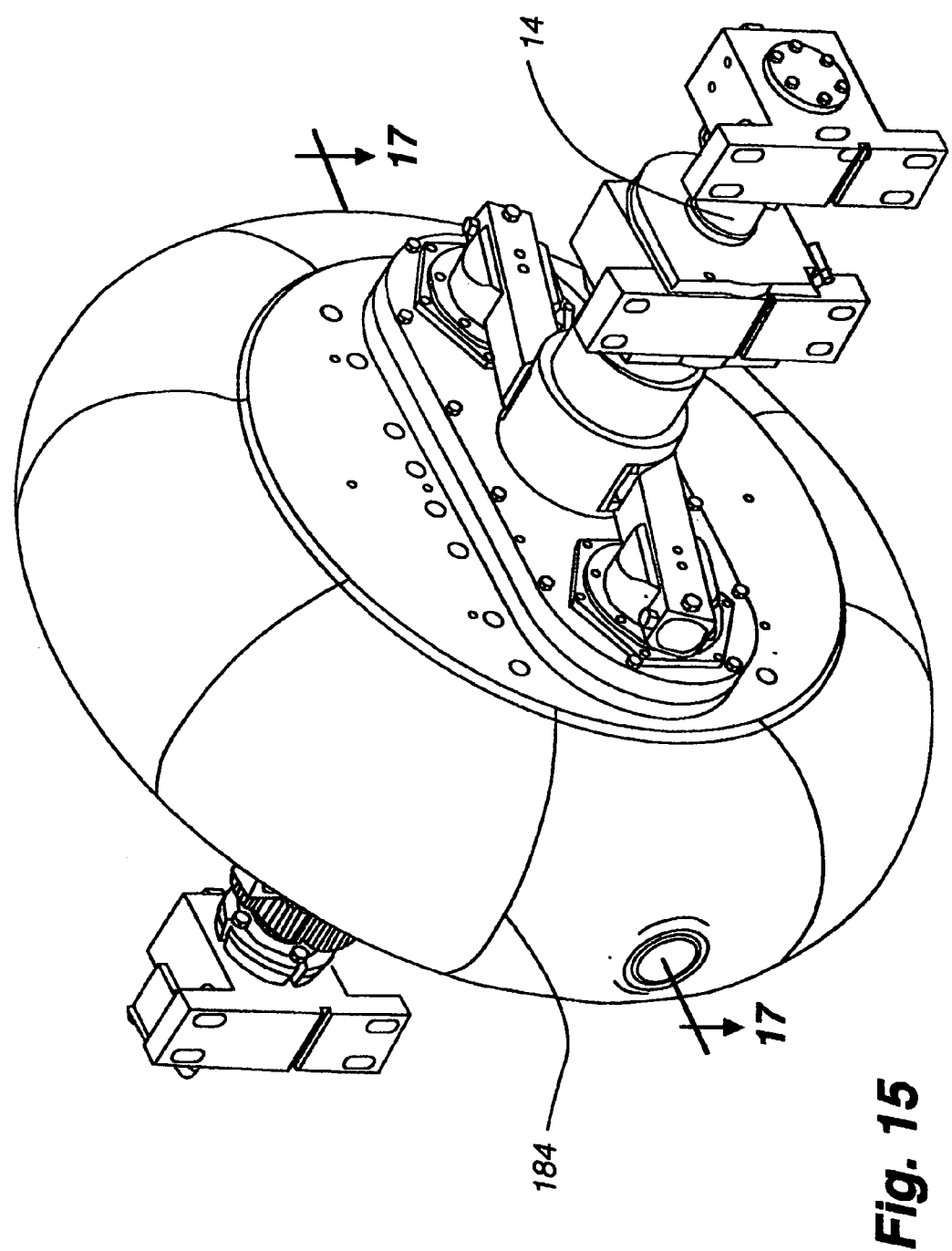
FIG. 15 depicts an isometric view of an alternative embodiment of a centrifuge arm, rotating shroud, and main shaft.
Figure 16:
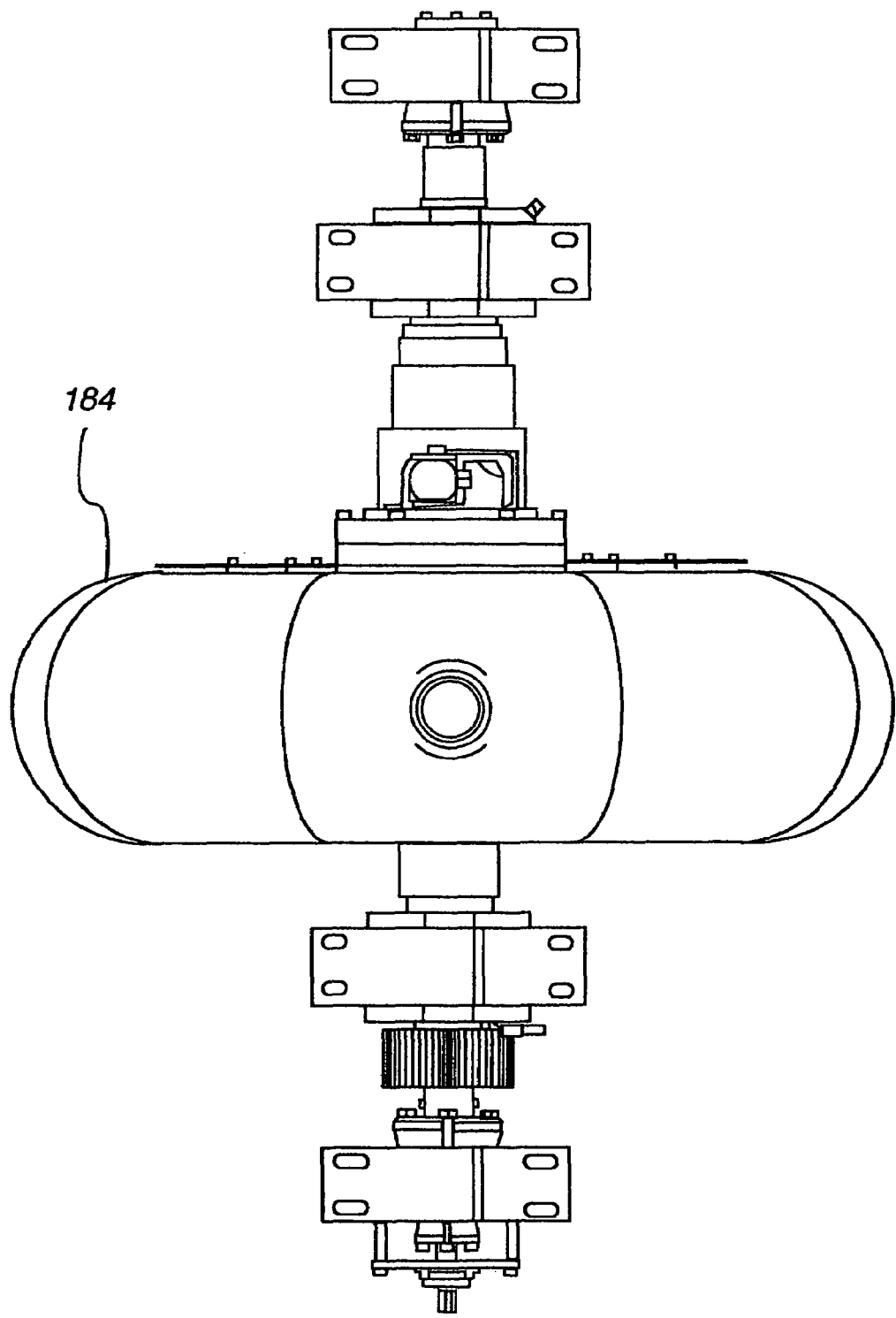
FIG. 16 is a side view of the alternative embodiment of FIG. 15.
Figure 17:
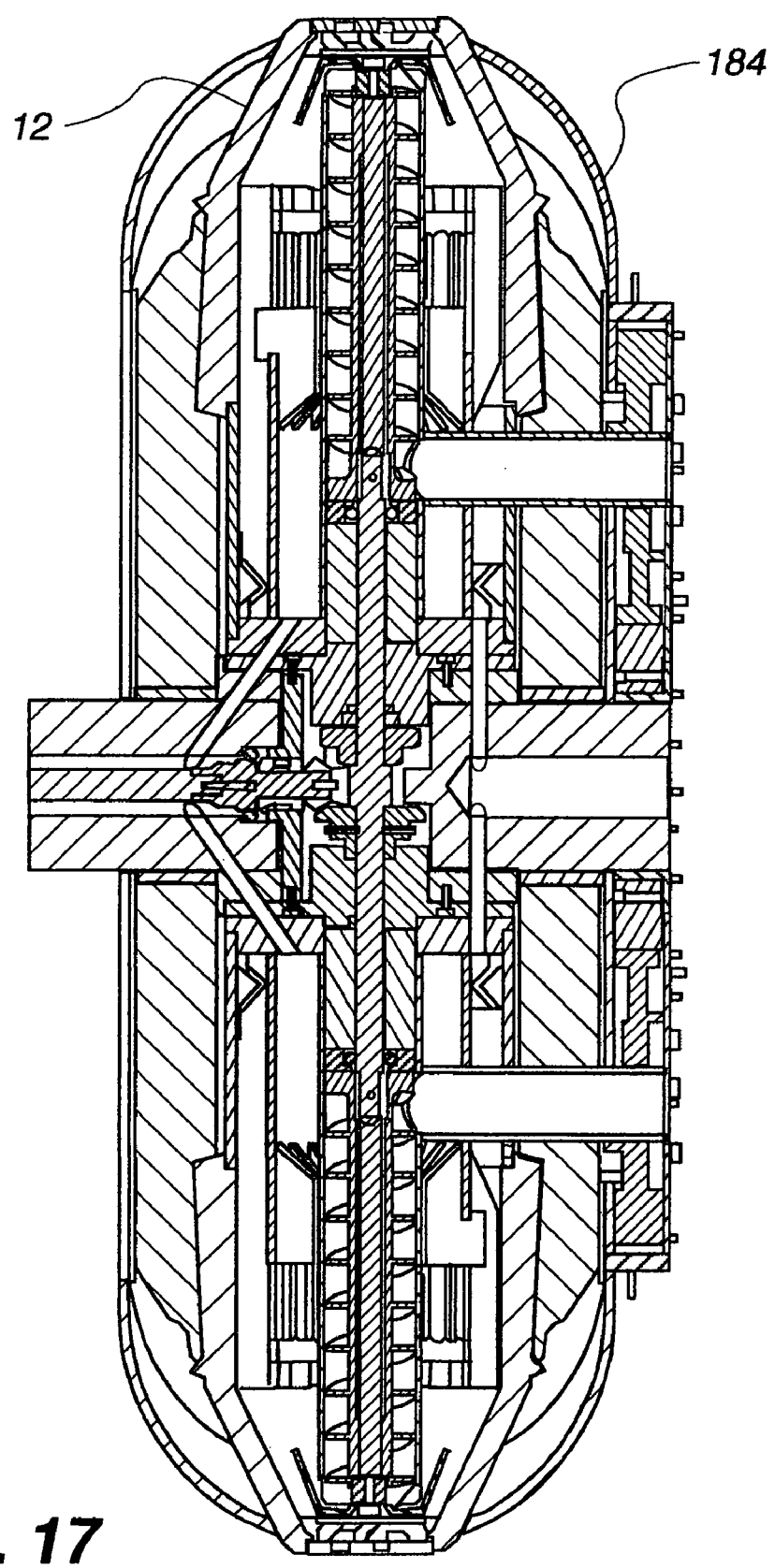
FIG. 17 depicts a cross-sectional view the alternative embodiment of FIG. 15, taken along line 17—17 of FIG. 15.

Yet another embodiment of the present invention may incorporate a shroud 184 affixed at one or more points to the arm 12 or end cap 82. FIG. 15, for example, is an isometric view of the main shaft 14 and rotating shroud 184 assembly removed from the frame 16, while FIG. 16 is a plan view of the same. FIG. 17 is a cross-sectional view taken along line 17—17 of FIG. 15. Generally, the rotating shroud 184 moves with the arm 12. By rotating both the shroud 184 and arm 12 together, power consumption by the embodiment may be reduced. Power consumption is reduced because the shroud is more aerodynamic than the arm alone, thereby reducing drag caused during rotation of the embodiment. Thus, less power is required to rotate the two together than simply the arm even though the shroud and arm together weigh more than the arm alone.

Figure 18:
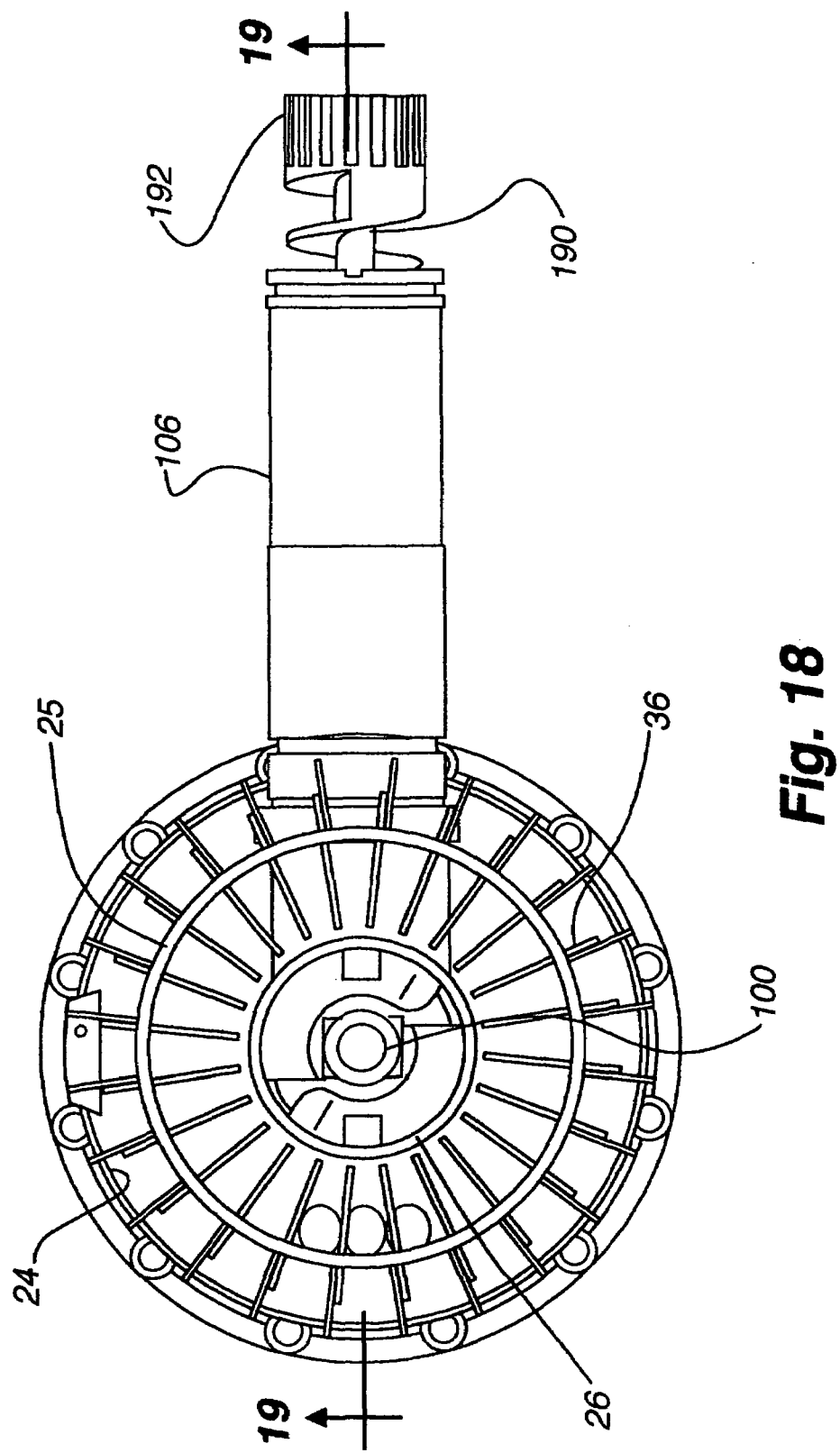
FIG. 18 depicts a top-down view of yet another alternative embodiment of a centrifuge arm showing a second auger placed within an exit arm.
Figure 19:
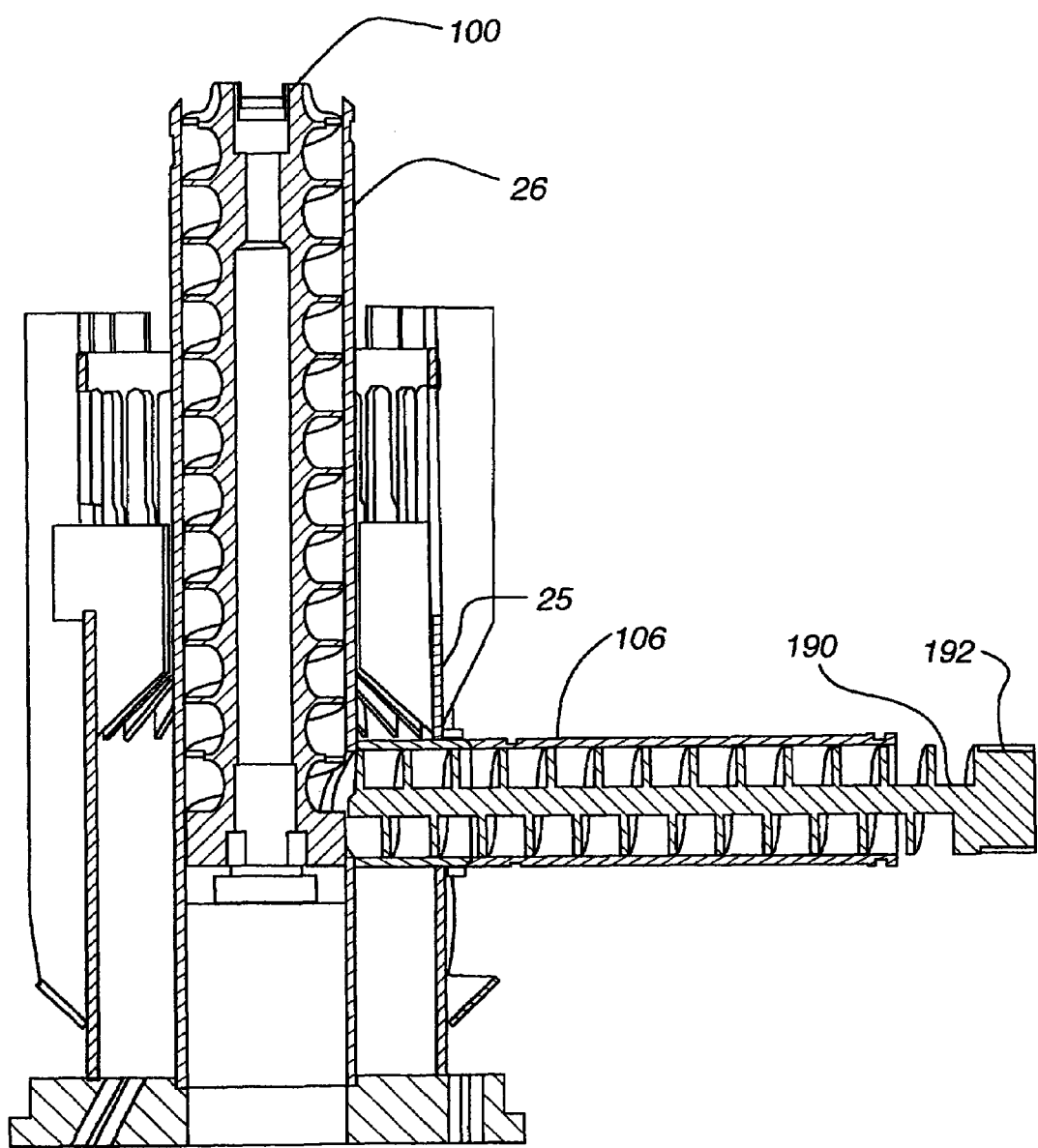
FIG. 19 is a cross-sectional view of the alternative embodiment of FIG. 18, taken along line 19—19 of FIG. 18.

Yet another alternative embodiment of the present invention may employ a second auger 190 placed in the exit arm 106. FIG. 18, for example, is a top-down view of a portion of the arm 12 assembly, including the arm sidewall 24, middle tube 25 and inner tube 26. FIG. 18 also depicts the first auger 100, exit arm 106 and second auger 190 extending outwardly from the exit arm. FIG. 19 is a cross-sectional view taken along line 19—19 of FIG. 18 with the arm sidewall 24 removed for clarity.

In this embodiment, solids generally move as previously described with respect to prior embodiments. That is, after collecting adjacent an end cap 82, the solids enter the interior of the inner tube 26 and travel downwardly, being mixed and/or chopped by the first auger 26 to exit through the exit arm 106. Here, however, the second auger 190 may facilitate expulsion of solids through the exit arm 106 by keeping solids in the exit arm mixed. The second auger 190 may also drive or push solids outwardly through the exit arm; the rotating blades of the second auger 190 generally may provide such a motive force to the solids. Likewise, the second auger 190 may restrict flow of solids through the exit arm 106 in order to increase solid compaction, potentially separate more liquid from the solids, and prevent rapid expulsion of large amounts of solids during operation of the embodiment. Whether the auger restricts flow or pushes solids through the exit arm 106 depends on the pressure within the arm 12. At higher pressures, the second auger 190 tends to restrict flow, while at lower pressures the auger tends to facilitate flow by moving or pushing the solids.

Further, the second auger may allow for a finer control of flow volume and/or speed of solids moving along the exit arm. If additional flow volume or speed is desired, the rotational speed of the second auger 190 may be increased. If flow volume or speed is to be decreased, the second auger's rotation may be slowed.

As shown to best effect in FIG. 19, the second auger 190 may terminate in an auger drive gear 192. The auger drive gear 192 may connect to a motor (not shown) to rotate the second auger 192 and drive or mix solids along the exit arm 106. Alternatively, the auger drive gear 192 may be placed at the opposite end of the second auger 190 and the end of the first auger 100 may be geared to mesh therewith. In this manner, both the first and second augers may be driven by a single motive source.

The various embodiments described herein may exhibit a variety of operational advantages. For example, certain embodiments of the present invention may provide greater centrifugal force at a lower number of arm rotations per minute than many previous centrifuges. As an example, some embodiments of the present invention may provide an acceleration equal to approximately 2500 times the force of gravity, or about 24,511 meters per second squared, at 1700 revolutions per minute of the centrifuge arm.

Yet another operational advantage lies in the present embodiment's ability to create a relatively large internal pressure within the centrifuge arm. This pressure is created through rotation of the centrifuge arm: the rotation spawns centrifugal force, which acts not only on the arm, but also on the contents of the arm. The sludge, liquids, and solids inside the arm are compacted by the centrifugal force, resulting in an interior pressure acting on these elements. Many times, these elements contain levels of chemicals and/or contaminants that may be susceptible to beneficial chemical reactions. Such reactions may, for example, cause the chemicals and/or contaminants to bind to one another or other compounds, thus facilitating removal from the elements within the arm, or alternatively neutralize the chemicals and/or compounds.

As known to those skilled in the art, an increase in pressure may cause certain classes of chemical reactions to accelerate. Alternatively, increased pressure may facilitate certain chemical reactions where none would otherwise occur. Where suitable chemicals or compounds are present in the elements (sludge, liquids, solids) within the arm, such reactions may occur during operation of the centrifuge. The reactions, in turn, may permit capture, neutralization, or containment of the chemicals. In one embodiment, these reactions may render the chemicals or contaminants more susceptible to capture, for example by causing the contaminants to clump together and be easier to strain. Such contaminants may be recycled for later use in applications where the contaminants may be beneficial. As an example, under pressure some nitrates, phosphates, or other nutrients may be captured from the sludge to be later used as fertilizer.

Although the present embodiment has been described with particular reference to certain apparatuses and methods of operation, those skilled in the art will appreciate that many changes may be made to the embodiments described herein without departing from the spirit and/or scope of the present invention. For example, a variety of materials may be used to manufacture the porous middle tube, the angulation of the top and bottom diffuser plates may be reversed, the exit arm 106 may move laterally along the arm's longitudinal axis instead of pivoting, and so forth. Accordingly, the proper scope of the invention is defined by the claims.

We claim:

1. A centrifuge for separating a first material from a second material in an input mixture, comprising: a housing having a body and an arm extending from the body, the arm attached to the body at a base end and free at a distal end; a chamber defined in the arm; a first tube positioned within the chamber; a second tube positioned within the chamber; a first flow path at least partially defined by the combination of the first tube and second tube; a second flow path at least partially defined by the second tube; a first exit in communication with the first flow path for evacuating the first material from the arm; a second exit in communication with the second flow path for evacuating the second material from the arm; an inlet operative to introduce the input mixture into the arm and in fluid communication with the chamber; and a diffuser positioned at least partially between the inlet and the first flow path.

2. The centrifuge of claim 1, wherein the diffuser is operative to spread the input mixture about a portion of the circumference of the chamber.

3. The centrifuge of claim 1, wherein the diffuser at least partially encircles the first tube.

4. The centrifuge of claim 3, the diffuser comprising: a bottom diffuser plate overlying the inlet; a top diffuser plate extending at an angle from the bottom diffuser plate; and a diffuser clip affixed to the top diffuser plate.

5. The centrifuge of claim 3, further comprising: an outer flow region defined by an outer sidewall of the first tube and an inner sidewall of the arm; a middle flow region defined by an inner sidewall of the first tube and an outer sidewall of the second tube; an inner flow region defined by an inner sidewall of the second tube; wherein the first flow path is the middle flow region; and the second flow path is the inner flow region.

6. The centrifuge of claim 5, further comprising: a solids exit in fluid communication with the second flow path, the solids exit extending through a sidewall of the arm; an exit arm, a first end of the exit arm in fluid communication with the solids exit, the exit arm formed outside the arm; and an outer aperture formed at a second end of the exit arm.

7. The centrifuge of claim 6, further comprising: a pivot point operatively attached to the exit arm; wherein the exit arm is pivotable about the pivot point; the outer aperture moves along the longitudinal axis of the arm as the exit arm pivots.

8. The centrifuge of claim 6, wherein the position of the outer aperture along the longitudinal axis of the arm defines a pressure gradient between the distal end of the arm and the outer aperture.

9. The centrifuge of claim 8, wherein: solids collect at the distal end of the arm; and solids flow through the second flow path with a velocity directly varying with the pressure gradient.

10. The centrifuge of claim 8, wherein: solids collect at the distal end of the arm; and a dryness of the solids exiting the outer aperture varies with the pressure gradient.

11. The centrifuge of claim 5, further comprising: an outlet passage in fluid communication with the first exit; and a valve operative to restrict flow of the first material through the first exit.

12. The centrifuge of claim 11, wherein the valve is further operative to adjust a pressure within the arm.

13. The centrifuge of claim 12, wherein: closing the valve increases the pressure within the arm; and a dryness of the second material evacuating from the arm varies with the pressure within the arm.

14. The centrifuge of claim 1, wherein the first material is liquid and the second material is solid.

15. The centrifuge of claim 1, wherein: a longitudinal axis of the first tube is aligned with a longitudinal axis of the arm; and a longitudinal axis of the second tube is aligned with a longitudinal axis of the arm.

16. The centrifuge of claim 15, wherein: the second tube is positioned within the first tube; and the first and second tubes are concentric.

17. The centrifuge of claim 16, wherein a distal end of the second tube extends beyond a distal end of the first tube.

18. The centrifuge of claim 15, wherein: the longitudinal axis of the arm is offset from an axis of rotation of the arm; and the first exit is closer to the axis of rotation of the arm than the second exit.

19. The centrifuge of claim 15, wherein: the first exit is positioned at a first distance from the axis of rotation of the arm; the second exit is positioned at a second distance from the axis of rotation of the arm; the second distance is greater than the first distance.

20. The centrifuge of claim 1, further comprising a flow restrictor positioned within the second tube.

21. The centrifuge of claim 20, wherein: the flow restrictor is an auger operative to restrict a flow of the second material to the second exit at a first pressure within the arm; and the auger is operative to enhance a flow of the second material to the second exit at a second pressure within the arm.

22. The centrifuge of claim 1, wherein at least a portion of the first tube is porous.

23. A centrifuge, comprising: a body; a centrifuge arm affixed to the body, the arm defining an interior space; a first tube positioned within the interior space, the first tube extending along a longitudinal axis of the arm; a second tube positioned within the first tube the second tube defining a second tube interior passage; a flow diffuser positioned at least partially about the circumference of the first tube; a liquid exit defined between the first and second tubes; a solids exit extending from the second tube interior passage; and an exit arm in fluid communication with the solids exit; wherein the exit arm is pivotable about a pivot point.

24. The centrifuge of claim 23, wherein: the exit arm further comprises an outer aperture defined at the end of the exit arm; and pivoting the exit arm about the pivot point moves the outer aperture along the longitudinal axis of the centrifuge arm.

25. The centrifuge of claim 24, wherein: the first and second tubes are concentric; and the solids exit extends through a sidewall of the second tube and a sidewall of the first tube.

26. The centrifuge of claim 23, further comprising: an end cap attached to the centrifuge arm, the end cap defining a distal end of the centrifuge arm; a means for moving solids along the second tube interior passage.

27. The centrifuge of claim 26, further comprising an end structure affixed to the second tube and adjacent the end cap, the end structure comprising: a first truncated conical structure; a second truncated conical structure; wherein a base of the first truncated conical structure and a base of the second truncated conical structure abut.

28. The centrifuge of claim 27, wherein the end structure further comprises: at least one radial channel formed on the surface of the end structure; and at least one transverse channel formed on the surface of the end structure; wherein the at least one radial channel is generally perpendicular to the at least one transverse channel.

29. The centrifuge of claim 26, wherein the means for moving solids comprises a pressure differential.

30. The centrifuge of claim 26, wherein the means for moving solids comprises an auger positioned within the second tube interior passage.

31. The centrifuge of claim 30, wherein: the means for moving solids further comprises a stirrer positioned adjacent the end cap; and a rotation of the auger turns the stirrer.

32. The centrifuge of claim 23, further comprising an auger disposed within the solids exit.

33. The centrifuge of claim 23, further comprising: a first clamshell piece; a second clamshell piece; at least one bolt securing the first clamshell piece to the second clamshell piece; wherein the clamshell at least partially defines an exterior of the centrifuge arm.

34. The centrifuge of claim 33, further comprising: an end cap attached to the centrifuge arm, wherein the end cap comprises a partially conical wall, the wall sloping from a larger end to a smaller end; wherein the first clamshell piece comprises a first sloping, curved inner wall segment; the second clamshell piece comprises a second sloping, curved inner wall segment; the partially conical wall of the end cap is received in the centrifuge arm between the first and second sloping, curved inner wall segments; the larger end of the end cap is positioned between the first and second clamshell pieces; and the smaller end of the end cap is positioned outside the first and second clamshell pieces.

35. The centrifuge of claim 23, comprising:
a phase shifter operably connected to the exit arm; wherein the exit arm may be moved along the outer surface of the centrifuge arm by the phase shifter.

36. The centrifuge of claim 35, wherein the exit arm may be moved laterally along the outer surface of the centrifuge arm by the phase shifter.

37. The centrifuge of claim 35, wherein the exit arm may be moved arcuately along the outer surface of the centrifuge arm by the phase shifter.

38. The centrifuge of claim 35, wherein the phase shifter may adjust the position of the exit arm during operation of the centrifuge arm.

39. The centrifuge of claim 23, further comprising a shroud attached to the centrifuge arm and operative to rotate with a rotation of the centrifuge arm.

* * * * *